(12) United States Patent
Kelly et al.

(10) Patent No.: US 11,568,898 B2
(45) Date of Patent: Jan. 31, 2023

(54) MULTIMEDIA COMPOSITING AND STORAGE MANAGEMENT SYSTEM

(71) Applicant: Fusion Holdings Limited, Douglas (IM)

(72) Inventors: Ross Hayden Kelly, Durban North (ZA); Quentin Maxime Chaillet, Tallinn (EE)

(73) Assignee: Fusion Holdings Limited, Douglas (IM)

( * ) Notice: Subject to any disclaimer, the term of this patent is extended or adjusted under 35 U.S.C. 154(b) by 0 days.

(21) Appl. No.: 17/353,466

(22) Filed: Jun. 21, 2021

(65) Prior Publication Data

US 2021/0407547 A1 Dec. 30, 2021

(30) Foreign Application Priority Data

Jun. 30, 2020 (GB) .................................... 2009982

(51) Int. Cl.
*G11B 27/036* (2006.01)
*H04L 65/60* (2022.01)

(52) U.S. Cl.
CPC ............ *G11B 27/036* (2013.01); *H04L 65/60* (2013.01)

(58) Field of Classification Search
CPC ....... G11B 27/036; H04L 65/60; G07F 17/32; G07F 17/3204; G07F 17/3206; G07F 17/322; G07F 17/3237; G07F 17/3239
See application file for complete search history.

(56) References Cited

U.S. PATENT DOCUMENTS

| | | | |
|---|---|---|---|
| 9,237,322 B2 * | 1/2016 | Chiu ................... | G11B 27/031 |
| 2014/0240353 A1 | 8/2014 | Goel et al. | |
| 2015/0199872 A1 * | 7/2015 | George ............... | G07F 17/3237 463/31 |
| 2016/0059135 A1 * | 3/2016 | Wright ................. | A63F 13/828 463/31 |
| 2018/0158136 A1 | 6/2018 | Huber et al. | |

FOREIGN PATENT DOCUMENTS

| | | |
|---|---|---|
| GB | 2412802 A | 10/2005 |
| WO | WO2009079560 A1 | 6/2009 |
| WO | WO2015048169 A1 | 4/2015 |

OTHER PUBLICATIONS

Combined Search Report and Examination Report for Application No. GB2009982.6 dated Dec. 15, 2021.
Extended European Search Report for Application No. 21181831.5-1208 dated Nov. 26, 2021.

* cited by examiner

*Primary Examiner* — Thai Q Tran
*Assistant Examiner* — Jose M Mesa
(74) *Attorney, Agent, or Firm* — McDonnell Boehnen Hulbert & Berghoff LLP

(57) ABSTRACT

A multimedia compositing method comprises selecting, from a plurality of video clip templates stored in a database of the computing system, a first video clip template that includes frames that depict a first object template moving in a first manner. The method further includes selecting, from a plurality of static images stored in the database of the computing system, a first static image that depicts a surface of a first object associated with the first object template; and overlaying the first static image over the first object template depicted in the first video clip template, respectively, to thereby provide a first rendered video clip associated with the first video clip template that includes frames that depict the first object moving in the particular manner.

18 Claims, 13 Drawing Sheets

MULTIMEDIA COMPOSITING AND STORAGE MANAGEMENT SYSTEM

CROSS-REFERENCE TO RELATED APPLICATIONS

The present application is a non-provisional patent application claiming priority to United Kingdom Patent Application No. 2009982.6, filed Jun. 30, 2020, the contents of which are hereby incorporated by reference.

FIELD

The application generally relates to systems and methods for compositing and managing multimedia content. In particular, this application is related to a multimedia content server for reducing memory requirements associated with storage of video content through multimedia compositing and a method for operating the multimedia content server.

BACKGROUND

Services that provide online entertainment can provide so-called "live studios" to enhance user experience of digitized entertainment activities. Examples of such digitized entertainment activities include casino games, such as poker, roulette, etc., which require a dealer or operator to manage the game. In these cases, a user can be presented with a video feed of the game via an online connection to the service (e.g., a video feed showing a dealer distributing cards), and the user can participate in the game in near real-time.

In some instances, the video feeds are pre-recorded and stored on a server. In the context of a card game, multiple video clips can be stored on the server. Each video clip can depict one of a myriad of combinations of hands that can be dealt during the game. The number of video clips required to simulate a particular game can increase with game complexity (e.g., as the number of possible card combinations increases). This, in turn, necessitates additional server storage capacity to store the video clips. Further, the server can be streaming the video clips to hundreds or thousands of users at any given time. Streaming a plethora of different video clips to different users necessitates increased processing power and network bandwidth.

SUMMARY

In a first aspect of an example embodiment, a computer-implemented method includes providing a first database including video clips of cards being dealt and, optionally, of blank cards previously dealt onto a playing surface in an order defined by rules of a game being played. Additionally, the method includes providing a second database including images representing card faces to be overlaid onto blank cards in video clips of the first database so as to imitate actual cards. Further, the method includes receiving, from a randomized card selector (RCSC), card information associated with cards to be dealt. Still further, the method includes combining video clips from the first database according to rules of the game being played and the cards to be dealt. Yet further, the method includes overlaying appropriate images of card faces from the second database onto blank cards in videos from the first database to imitate the appropriate cards in a video sequence formed by the combined video clips. Further, the method includes providing the video sequence for display to the user.

In another aspect, an article of manufacture includes a non-transitory computer-readable medium, having stored thereon program instructions that, upon execution by at least one processor, cause a computing device to perform the operations of the first aspect. In yet another aspect, a computing device includes at least one processor, a memory component, and program instructions, stored in the memory component, that upon execution by the at least one processor, cause the computing device to perform the operations of the first aspect.

In some examples described herein in which a computer software product is used, the computer software product is non-transitory and store instructions on physical media such as a DVD, or a solid-state drive, or a hard drive. In some examples described herein, the computer software product is transitory and in the form of instructions provided over a connection such as a network connection that is linked to a network such as the Internet.

These aspects, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
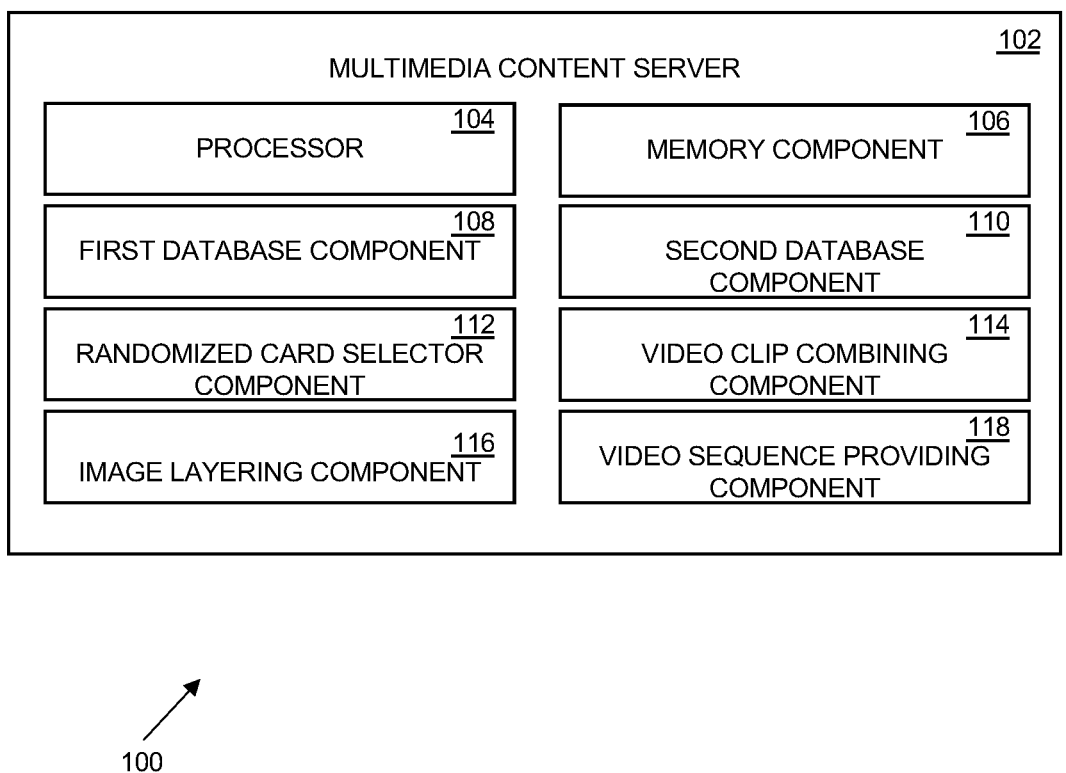
FIG. 1 is a simplified block diagram of a multimedia content server, in accordance with an example.

Various examples of devices and methods are described below. Words such as "example" and "exemplary" that may be used are understood to mean "serving as an example, instance, or illustration." Any embodiment, implementation, feature described herein as being an "example" or "exemplary" is not necessarily to be construed as preferred or advantageous over any other embodiment, implementation, or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For the purpose of this description, the terms "multiple" and "a plurality of" refer to "two or more" or "more than one."

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

I. Introduction

This application describes example embodiments including, but not limited to, embodiments pertaining to managing multimedia content to simulate a live entertainment activity (e.g., an actual card game) on an electronic device. According to certain examples, a randomized card selector component (RCSC) is configured to randomly determine card information (e.g., card numbers, card suits) associated with one or more cards that should be presented during the entertainment activity, and images associated with the card information are overlaid onto certain video clips to simulate live aspects of the entertainment activity. Video clips may be combined to form a video sequence that simulates the desired entertainment activity. The video sequence is provided for display to a user, who may, in turn, experience the video sequence as if it is a live entertainment activity.

As noted above, the number of video clips required to simulate a particular game can increase with game complexity (e.g., as the number of possible card combinations increases). Further, the time, efforts, and cost incurred in generating the video clips can be substantial because of the number of person-hours required to generate the video clips and other ancillary costs (e.g., equipment and facility rentals).

In an example, preparing the video clips involves pre-recording all the possible different occurrences and results of a game, such as a roulette game. A randomized card selector component (RCSC) is then configured to determine/select one of the pre-recording videos for presentation during an entertainment activity. For example, where there are thirty-seven possible results in a roulette game, at least thirty-seven different video clips are available to show to the user. In some examples, multiple clips showing the same result are used to prevent a user from easily recognizing the same video clip after continuous play of the game.

In some examples, video clips are combined to provide the impression of a continuous video stream to a user. As an example, twenty different clips of a roulette operator initiating a spin can be used along with five different clips for each of the thirty-seven different results. By continuously combining a clip of an operator initiating a spin with a clip of a randomly determined result, a user is provided with a video sequence that continuously changes but which provides an experience that simulates a real, live casino studio environment. If the exact same clip of an operator initiating a spin is repeatedly used, the user may be able to recognize the fact that the video is not live, which can lead to an undesirable experience for the user.

The example above requires a total of 185 video clips to provide a sequence of video clips simulating a live event (twenty clips of a spin being initiated, and five different videos for each of the thirty-seven possible results). The relatively low number of possible results is beneficial, as a limited number of video clips need to be recorded and stored for use.

In games where a significantly higher number of results are possible, such as card games, the video capturing and data storage requirements are significantly higher. Take, for example, a simple two-card Blackjack hand played with a single deck of 52 cards. As there are 52 playing cards in a deck of cards, for every card that may be dealt to a player, any one of the remaining 51 cards can be provided next to the dealt card. This results in 52×51, i.e., 2652, possible visually different two-card combinations that must be available to show to a user. According to the rules of Blackjack, for hands that do not have a value of twenty-one, a player can choose to draw another card. This provides another 50 possible results for each of the hands to which a card may be added. There are 64 two-card combinations that result in a value of twenty-one, and these may appear in any visual order. As a result, 128 visually different two-card hands, which total to 21, may be dealt to a player. Thus, there are 2652−128=2524 visually different hands-on, which a player may elect to receive another card. For these hands, any one of the remaining 50 cards may be dealt with, i.e., 2524 times 50, which provides 126,200 different video clips that are required just to simulate the possible hands of one player with three cards.

The number of required video clips rapidly increases when it is considered that a user may draw further cards as long as their hand total is still under twenty-one, that the dealer should be dealt some cards, and that other players may also receive cards. If more than one card deck is used, the number of required video clips increases further.

As will be appreciated, the number of video clips to be captured in order to simulate a live casino game that involves card decks may be prohibitively large both from a capturing time and processing perspective, as well as from a data storage perspective.

Examples for overcoming these and other shortcomings are described herein in connection to the card game baccarat, though the examples can be applied to other card games or games generally.

In an example, a first database includes rendered video clips of cards being dealt to a user. Examples of these rendered video clips depict distinct areas where cards may or should be dealt. Each rendered video clip depicts an appropriate number of cards being dealt into an active distinct area. Examples of the rendered video clips can further include cards previously dealt in inactive distinct areas that remain stationary on the display. In examples, previously dealt cards in the inactive distinct areas are depicted as blank cards (i.e., object template) in the videos.

In an example, the first database includes individual rendered video clips showing all possible cards being dealt into the different distinct areas, with any cards in inactive areas shown as blanks, as appropriate. In some examples, for a single card being dealt into an active distinct area, a single video of a blank card being dealt is digitally modified 52 times to include a face of each of 52 possible cards as it appears during dealing thereof. The face of a card is the visual representation of the value and suit of the card. In an example, 52 different rendered video clips, one for each possible card, are created from a video clip template that depicts a single blank card being dealt. If a distinct area includes two cards, as may be required in games such as baccarat, 2,704 (i.e., 52×52) rendered video clips are required to display all possible card combinations. In an example, these 2,704 rendered video clips are created from a video clip template that depicts two blank cards being dealt into the relevant distinct area.

When the cards in a distinct area have been dealt, the position of the (digitally modified) card faces will remain stationary whilst further cards are being dealt. The distinct area in which these cards have been dealt now becomes an inactive distinct area, and the card faces can be stored as an image file. Then, when a subsequently rendered video clip requires the previously saved card faces to be shown on the relevant inactive distinct area and onto the blank cards (i.e., object template) in that inactive distinct area, the appropriate image file is overlaid on top of such rendered video clip to simulate the appropriate card face in the correct position. Thus, any one of 52 different image files can be used and overlaid on top of a blank card (i.e., object template) in an inactive distinct area to simulate any one of a possible 52 cards. By overlaying the appropriate image file on top of another rendered video clip, the number of overall rendered video clips required is significantly reduced. Although image files will also be required, it will be apparent that the image files will require significantly less storage space than videos of the same quality.

For two cards being dealt, there are 2,704 (i.e., 52×52) possible combinations. If a further card is to be dealt, there are 140,608 (i.e., 2,704×52) possible three-card combinations. If every one of the possible three-card combinations where to be individually filmed and available as a single video file, 140,608 video files would be required.

However, if 2,704 images representing the possible card faces of the first two cards are stored and usable to simulate all possible faces on these two cards, only 52 additional rendered video clips are required. Then, an appropriate image can be selected to simulate the first two card values from the 2,704 images and can be overlaid on top of blank cards in the position of the first two cards in the rendered video clip of the third card being dealt. As a result, the number of rendered videos required to simulate all possible three-card combinations is reduced from 140,608 to 2,756 (i.e., 2,704+52). An additional 2,704 image files would also be required. This significantly reduces data storage requirements for providing a user with such an entertainment activity.

In an example, a first database contains the rendered video clips showing cards being dealt, with any previously dealt cards shown as blanks. In an example, the rendered video clips are combined to provide the desired video sequence, whilst overlaying the appropriate image from a second database containing all possible image files to represent already-dealt cards on any blank cards. The more cards that are to be dealt and the more card faces that are stored as images for overlaying at a later stage, the more the reduction in videos required and accompanying reduction in data storage requirements.

In an example, a randomized card selector component (RCSC) is configured to randomly determine which cards are to be used, dealt, and revealed. The rules of the game (e.g., baccarat), then influence which of the possible rendered video clips and images to use in simulating the entertainment activity.

The systems and methods disclosed herein result in a significant reduction in the number of rendered video clips that need to be stored in order to simulate a live entertainment activity to a user. By storing image files that can be overlaid onto a video, the total data storage capacity is significantly reduced, particularly when considering that the quality/resolution of video clips required to simulate a live event is significant. As a result, data storage requirements are significantly reduced. In addition, video capturing time required to capture live video clips for all possible combinations is also significantly reduced. This reduces the working time for individuals required to capture such videos and rental requirements for studios where such videos should be captured. In examples, these aspects are provided where the content is transmitted to a user over a network, such as the Internet, or when the content is hosted on a local device, for example, a dedicated gaming machine or on an electronic device of a user.

II. Example Architecture

FIG. 1 is a block diagram 100 depicting an example of a multimedia content server 102 configured to implement operations in accordance with various implementations described herein. Examples of the multimedia content server 102 can take any of a variety of forms, including a dedicated multimedia content server, a personal computer, a server computer, a personal digital assistant, a mobile phone, a tablet device, a dedicated gaming machine, and/or other computing devices. The multimedia content server 102 facilitates access to entertainment activity or services, such as casino games.

An example of the multimedia content server 102 is configured to implement any of the methods as described herein. An example of the multimedia content server 102 includes a processor 104 arranged to execute the functions of various components, which are provided by hardware or by software units executing on the multimedia content server 102. The software units are stored in a memory component 106, and instructions are provided to the processor 104 to carry out the functionality of the described components. In some examples, the various components include a first database component 108, a second database component 110, a randomized card selector component (RCSC) 112, a video clip combining component 114, an image overlaying component 116, and a video sequence providing component 118.

An example of the first database component 108 stores a plurality of rendered video clips that depict aspects of the entertainment activity, for example, cards being dealt according to rules and procedures of a particular card game, such as baccarat, poker, blackjack, etc.

An example of the second database component 110 stores a plurality of image files that represent card faces to be overlaid onto videos from the first database component to imitate values of blank cards in the videos.

An example of the RCSC 112 is configured to randomly determine which cards are to be dealt. In some examples, the determination by the RCSC 112 is performed in accordance with the rules of the specific game.

An example of the video clip combining component 114 is configured to combine appropriate rendered video clips from the first database component 108 to facilitate simulation of the appropriate entertainment activity. In some examples, the selection of the rendered video clips is performed in accordance with rules of the specific game, and based the cards selected by the RCSC 112.

An example of the image overlaying component 116 is configured to overlay/superimpose appropriate images onto the combined rendered video clips so as to form a complete rendered video sequence or clip. The images can be retrieved from the second database component and can be overlaid onto blank cards or card templates depicted in the rendered video clips that act as placeholders for appropriate images/values for the blank cards.

An example of the video sequence providing component 118 is configured to provide a complete video sequence for display to a user. In some examples, the video sequence providing component 118 streams the video sequence for viewing on a remote display associated with and/or accessible by the user. Additionally, or alternatively, the video sequence providing component 118 can provide the video sequence for viewing on a local display if the multimedia content server is in the vicinity of the user.

III. Example Operations

Figure 2:
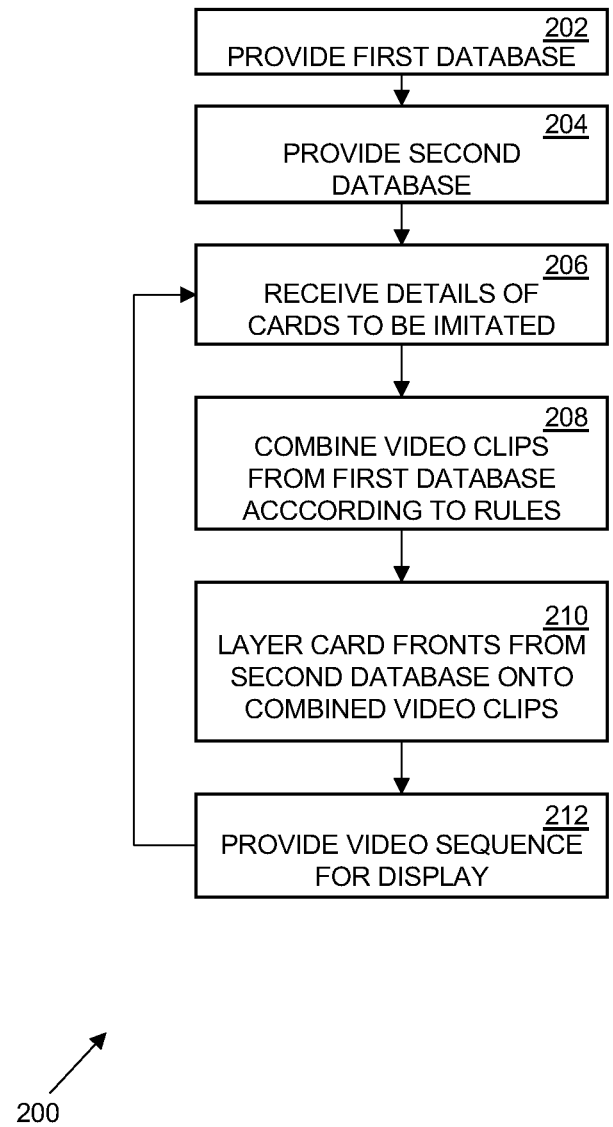
FIG. 2 depicts a flow diagram that illustrates a method performed by the multimedia content server, in accordance with an example.

FIG. 2 depicts a flow diagram 200 that illustrates an example method performed by the multimedia content server. Operations of the method are shown within blocks 202 to 212. The example method can relate to providing entertainment activities, such as casino games, to users. Any operation described below, or elsewhere in this description, with respect to FIG. 2, can be performed, at least in part, by a processor, such as the processor 104 executing software program instructions. In the example detailed by the present flow diagram 200, a user can participate in a simulated live card game such as baccarat. Video clips are combined, modified, and provided to the user in order to simulate a "live dealer" type of game to the user.

Block 202 includes providing, by the multimedia content server, a first database. An example of the first database includes a plurality of rendered video clips that simulate cards being dealt according to various possibilities of a specific game being played, such as baccarat. Examples of the rendered video clips depict cards being revealed and placed into specific active designated areas. The fronts or faces of cards may have been added to the rendered video clips by modifying video clip templates that depict a blank card being dealt and revealed. Previously revealed cards in different inactive designated areas in the rendered video clips may be blank.

Block 204 includes providing, by the multimedia content server, a second database. An example of the second database includes images that can be overlaid onto video clips stored in the first database. In some examples, the images represent possible cards faces and are placed onto blank cards in inactive designated areas to facilitate overlaying different image files on top of a video clip instead of having a single video file showing a card being dealt in an active designated area for each and every possible card or card combinations that may be in any one or more inactive designated area, where previously dealt cards may be.

Block 206 involves receiving, from an RCSC 112 of the multimedia content server, details of cards to be imitated during gameplay to the user. In an example, this information is influenced by the cards available to play with, the rules of the specific game, and the RCSC 112.

Block 208 involves combining, by the multimedia content server, rendered video clips from the first database according to the rules of the game.

Block 210 involves overlaying images representing card faces from the second database onto blank cards in inactive distinct areas in the combined rendered video clips to form a video sequence.

Block 212 involves providing the video sequence for display to a user. In an example, providing the video sequence involves streaming the video sequence to an electronic device of a user for display or displaying the video sequence on a display uniquely associated with the multimedia content server.

After the video sequence has been shown to a user, any winnings or losses are processed according to the game rules and the size of any wagers, if any, placed on the game by the user. The method then returns to block 206 at the start of a further gameplay iteration.

One or more of the operations described above can be implemented by hardware and/or software associated with an electronic device and/or implemented by hardware and/or software distributed across multiple electronic devices. Examples of such electronic device(s) include the multimedia content server described above, a client/user-side mobile device, a personal computer, laptop computer, personal digital assistant, smartphone, feature phone, satellite phone, server computer, phablet, tablet, wearable computer, or the like. Appropriate components can form part of such a device for the operation of the required method on that device. Some examples of the electronic device(s) are configured to communicate wirelessly or over a wired communication network. The various components forming part of each electronic device can be configured to communicate with each other via an appropriate communication interface, while an appropriate external communication interface can be provided to facilitate communication with other electronic devices, whether forming part of the present systems or not.

As noted above, an entertainment activity that mimics a live activity, such as a card game, can be provided to a user by combining pre-recorded rendered video clips into sequences of rendered video clips that correspond to all the possible moves of the entertainment activity (e.g., all the possible moves of a real dealer at a gaming table). One example of such a card game is baccarat. FIGS. 3 to 7 illustrate various card positions of baccarat that can be pre-recorded and combined into sequences of video segments to mimic a live game of baccarat.

Figure 3:
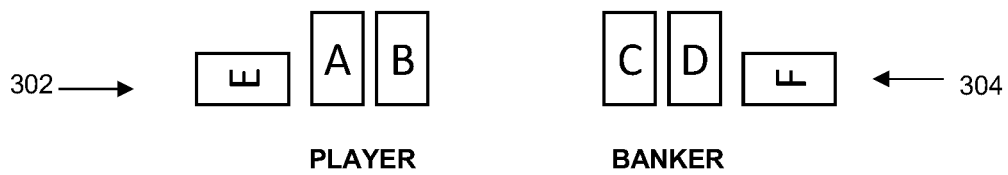
FIGS. 3 to 7 show various card layouts that are dealt by the multimedia content server during a card game, in accordance with an example.

FIG. 3 shows all possible card positions that can be dealt during a round of baccarat. Baccarat is typically played with six to eight decks of cards, although the number of decks can be different. Cards are dealt in a predefined way, with all possible occupied positions as shown. While different types of baccarat do exist, the Punto Banco version is used for this description and will simply be referred to as "baccarat." It will be appreciated that the same principles described herein can be applied to other versions of baccarat, and also other card games.

In baccarat, two competing hands are dealt, called the "player" hand and the "banker" hand. The word "player" does not refer to the user playing the game. Rather "player" identifies the specific hand, which is, in turn, used in the order and rules of cards being dealt. Similarly, the word "banker" is used to refer to the other competing hand. The rules of the game differentiate between the two hands as to when additional cards are added to each hand. A user can place a bet on the banker hand or the player hand, betting that such hand will win. Other than such a bet placed on any of the hands, there is no further interaction from a user required to allow play of the game. Only the rules of the game determine gameplay.

In the figure, cards A and B are the initial cards of the player hand 302, and cards C and D are initial cards of the banker hand 304. Cards are typically dealt in the order A-C-B-D. The rules of the game, as further described below, then determines whether cards E and/or F are also dealt.

Figure 4:
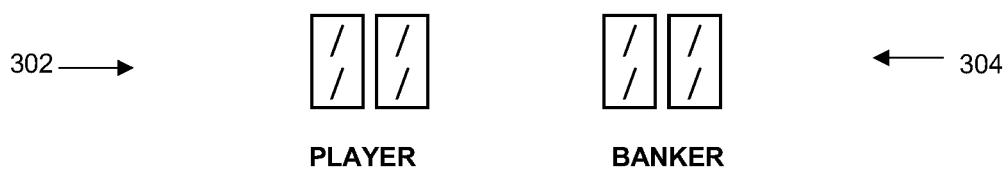

FIG. 4 shows initial hands dealt to the player hand and the banker hand. Cards A to D, as identified in FIG. 3, are shown face down. When these cards are turned over, the rules of the game will determine whether cards E and/or F are dealt. If no further cards are to be dealt, the game ends with the layout shown in FIG. 4.

The rules of the game consider the value of the player hand and the banker hand to determine whether any more cards are dealt after the initial two cards. The value of a hand is equal to the last digit of the sum of the values of the cards, with the ten, jack, queen, and king all having a value of ten (or, as only the last digit is important, their effective value is zero). The goal of baccarat is to obtain a hand with a value closest to nine. The hand that is the closest (i.e., the player hand and the banker hand) wins the hand. If both hands have the same value, the game is a draw.

If any one of the two hands has an initial value of eight or nine, no more cards are dealt to any hand. A hand with an initial value of eight or nine is known as a "natural" hand. The hand with a value closest to nine then wins that round, or it may be a draw. If neither of the hands has a total of eight or nine, further cards could be dealt.

If the player's hand is valued at six or seven, the player will not be dealt another card (or the player "stands pat").

Figure 5:
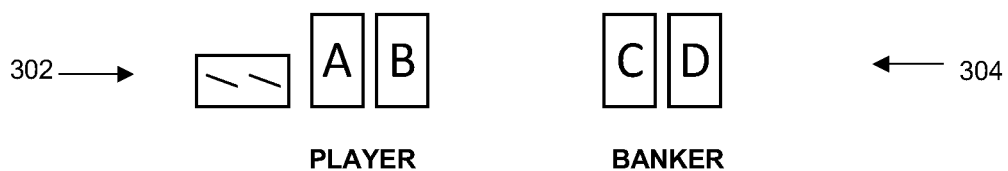
Figure 6:
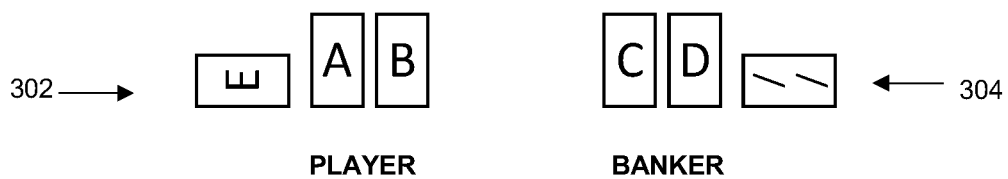

However, as shown in FIG. 5, if the player hand has an initial value of zero to five, the player is dealt another card shown face down. As shown in FIG. 6, the card can then be turned around to reveal its value, which in this case is E. Also, in FIG. 5, cards A to D have been turned over, in the order A-B for the player hand, then C-D for the banker hand.

Whether another card is then dealt to the banker hand after a third card is dealt to the player hand is determined by the value of the third card dealt to the player in FIG. 5, and the initial value of the Banker's hand. When the banker hand's initial value is eight or nine, the hand is considered to be a "natural" hand, and the player would not have drawn a third card. If the banker hand's initial value is seven, the hand never receives a third card, i.e., the banker always stands pat. When the banker hand's initial value is six, the hand only receives a third card if the player's third card is a six or seven. When the banker hand's initial value is five, the hand only receives a third card if the player's third card is a four to seven. When the banker hand's initial value is four, the hand only receives a third card if the player's third card is a two to seven. When the banker hand's initial value is three, the hand receives a third card unless the player hand's third card is an eight. When the banker hand's initial value is two or less, the hand always draws a third card, regardless of the player hand's third card. If no further cards are to be dealt, the game may end with the current layout. FIG. 6 shows a third card dealt to the banker hand, with the card still face down.

Figure 7:

FIG. 7 shows another possible hand, following from FIG. 4. If the player stood pat and did not receive a third card, i.e., the value of the player hand was six or seven, the banker will receive another card, card F if the value of the banker hand is zero to five. If the initial value of the banker hand is six or seven, the banker also stands pat, and if the initial banker hand value is eight or nine, it would have been a natural, and no cards would be drawn.

Figure 8:
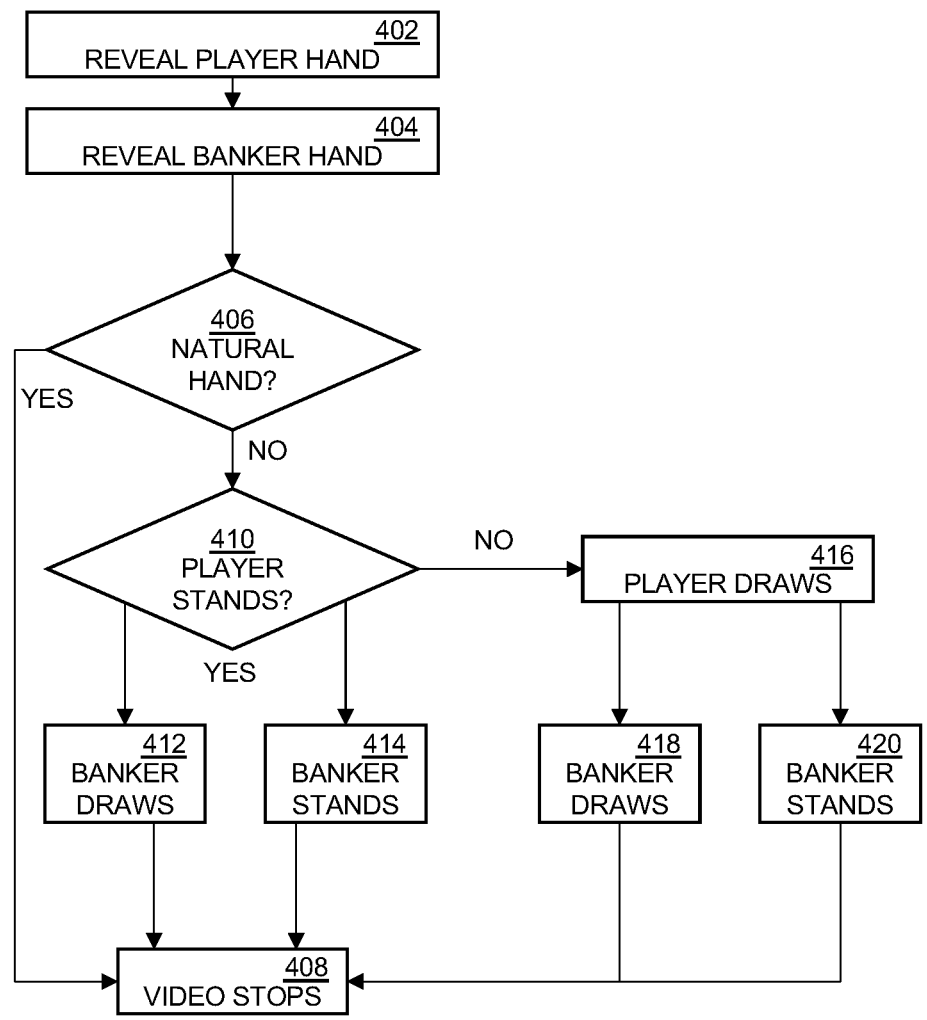
FIG. 8 is a flow diagram showing a decision process in how cards are dealt in a card game, in accordance with an example.

As noted above, the systems and methods disclosed herein result in a significant reduction in the number of video clips that need to be stored and recorded to facilitate simulation of a live entertainment activity by overlaying image files onto a reduced number of video sequences. To help illustrate this point, it is helpful to understand the number of video sequences that would otherwise need to be recorded and stored to facilitate simulation of a live entertainment activity. FIG. 8 and the description that follows is provided to help illustrate this point.

FIG. 8 is a flow diagram 400 of the rules of baccarat that govern that way in which cards are dealt to the player hand and the banker hand. The description that follows assumes that six decks of cards are used.

At block 402, the player hand is revealed. As mentioned above, there are 2,704 possible two-card combinations for the player hand. And at block 404, the banker hand is revealed. Again, there are 2,704 possible two-card combinations for the banker hand. Therefore, at this stage, there are 2,704 times 2,704 or 7,311,616 possible combinations for the four cards on the table. Thus, 7,311,616 video clips would need to be recorded and stored just to show the possible card combination at this stage.

At block 406, if the hand is a natural hand, then at block 408, recording of the video clip may stop. There are 512 combinations for each of the two hands where the value of any such hand would correspond to a natural hand. Thus, for 2,704 minus 512, or 2,192, different possible hands for each of the banker hand and the player hand, further analysis may be needed to determine if more video clips are required. 2,192 times 2,192 or 4,804,864, is the number of possible hands from the 7,311,616 possible hands that require further investigation. For the remaining 2,506,752 possible hands, the recording of the video clip can terminate at block 408 when a natural hand is detected at block 406.

The rules of baccarat then determine the route of the game and, accordingly, the additional number of video clips that need to be recorded. The player hand may stand pat or may draw. There are 512 possible hands for the player hand where the player hand totals to be six or seven, and the player hand will stand. If at block 410, the player stands, the banker may draw as in block 412 or may stand as in block 414.

There are 1,680 different possible banker hands where the value of the banker hand is zero to five, and in which the banker hand will draw a card when the player hand does not, as at block 412. Thus, for each of the 512 possible player hands where the player hand stands but the banker hand then draws, there are 1,680 corresponding banker hands where the banker draws a card. Thus, for each of the 1,680 times 512 (860,160) possible hands where the banker hand should draw a card when the player hand does not, there are 52 different possible cards that may be drawn. This requires 860,160 times 52, or 44,728,320. To show all such possible card combinations, 44,728,320 video clips would need to be recorded and stored. No further cards may then be dealt, and the flow diagram may move on to block 408, where the game terminates, and the videos may stop.

There are 512 different possible banker hands with a value of six or seven, and where the banker hand will also stand, as at block 414. The player hand and banker hand will thus both stand pat in 512 times 512, or 262,144, of the possible initial hands. This does not increase the required video files as no further cards are dealt. The flow diagram may then move on to block 408. This increases the total number of hands where neither the player hand nor the banker hand draws a card from 2,506,752 (all-natural combinations) by 262,144 (i.e., 2,768,896).

If the player hand does not stand in block 410, the hand will draw another card, and the flow diagram may move on to block 416. There are 1,680 different possible initial player hands with a value of zero to 5. Each of these have a corresponding 2,192 initial banker hands that are not natural hands. As a result, in 1,680 times 2,192 (3,682,560) of the 7,311,616 original possible hands, the player hand would draw another card. Each of these possible hands can lead to any one of 52 cards being dealt to the player hand. Thus, the required single video files at this stage is 191,493,120 (i.e., 3,682,560×52).

Now, with a third card drawn by the player, the rules of the game (as outlined above) determine whether the banker hand receives another card, and therefore if more video clips need to be recorded and stored. The value of the third card drawn by the player now determines whether more video clips need to be recorded and stored to allow the display of all possibilities. When the rules of the game determine that a third card should now be drawn by the banker hand, the flow diagram may move to block 418. When the banker hand should not draw a third card, the method may move to block 420, where the banker stands, and then onto block 408, where the video may end.

There are 912 possible banker hands with an initial value of two or less, where a third card is always drawn by the banker hand if the player hand has drawn a third card. For each of these 912 banker hands, there are a corresponding 1,680 player hands that lead to a third card being drawn by the player hand, i.e., 1,532,160 possible combinations of initial hands. There are 52 possible player cards that may have been drawn by the player hand, providing 1,532,160 times 52, or 79,672,320, combinations of five cards at that stage. Then, for each of these combinations, there are 52 possible cards that may be drawn by the banker hand. This equates to 79,672,320 times 52, or 4,142,960,640. Thus 4,142,960,640 video clips need to be recorded and stored for all possible card combinations that could result from the above characteristics.

There are 256 possible banker hands with an initial value of three, where a third card is drawn by the banker hand if the player hand has drawn a third card that is not an eight. For each of these 256 banker hands, there are a corresponding 1,680 player hands that lead to a third card being drawn by the player hand, i.e., 430,080 possible combinations of initial hands. The four eights will allow the video to stop there, as no further cards need to be dealt. There are 48 possible player cards that may have been drawn by the player hand that will not be an eight, providing 430,080 times 48, or 20,643,840, combinations of five cards at that stage. Then, for each of these combinations, there are 52 possible cards that may be drawn by the banker hand. This equates to 20,643,840 times 52, or 1,073,479,680, single video files that would be required for all possible card combinations that could result from the above characteristics.

There are 256 possible banker hands with an initial value of four, where a third card is drawn by the banker hand if the player hand has drawn a third card that is any of two to seven. For each of these 256 banker hands, there are a corresponding 1,680 player hands that lead to a third card being drawn by the player hand, i.e., 430,080 possible combinations of initial hands. Any third card to the player hand other than a two to seven will allow the video to stop there, as no further cards need to be dealt. There are 24 possible third cards that may have been drawn by the player hand that will be any of a two to a seven, providing 430,080 times 24, or 10,321,920, combinations of five cards at that stage. Then, for each of these combinations, there are 52 possible cards that may be drawn by the banker hand. This equates to 10,321,920 times 52, or 536,739,840, video clips that would need to be recorded and stored to show all possible card combinations that could result from the above characteristics.

There are 256 possible banker hands with an initial value of five, where a third card is drawn by the banker hand if the player hand has drawn a third card that is any of four to seven. For each of these 256 banker hands, there are a corresponding 1,680 player hands that lead to a third card being drawn by the player hand, i.e., 430,080 possible combinations of initial hands. Any third card to the player hand other than a four to a seven will allow the video to stop there, as no further cards need to be dealt. There are sixteen possible third cards that may have been drawn by the player hand that will be a four to a seven, providing 430,080 times 16, or 6,881,280, combinations of five cards at that stage. Then, for each of these combinations, there are 52 possible cards that may be drawn by the banker hand. This equates to 6,881,280 times 52, or 357,826,560, video clips that would need to be recorded and stored to show all possible card combinations that could result from the above characteristics.

There are 256 possible banker hands with an initial value of six, where a third card is drawn by the banker hand if the player hand has drawn a third card that is six or seven. For each of these 256 banker hands, there are a corresponding 1,680 player hands that lead to a third card being drawn by the player hand, i.e., 430,080 possible combinations of initial hands. Any third card to the player hand other than a four to a seven will allow the video to stop there, as no further cards need to be dealt. There are eight possible third cards that may have been drawn by the player hand that will be a six or a seven, providing 430,080 times 8, or 3,440,640, combinations of five cards at that stage. Then, for each of these combinations, there are 52 possible cards that may be drawn by the banker hand. This equates to 3,440,640 times 52, or 178,913,280, video clips that would need to be recorded and stored to show all possible card combinations that could result from the above characteristics.

The banker hand will never receive a third card if its initial value is seven.

After the third card is dealt to the banker hand, the flow diagram may move to block 408, where the video and the iteration of the game may end.

To summarize, there are over six billion possible six-card combinations in the game of baccarat. As six is the maximum number of cards on the table, this contributes to the largest number of possible card combinations. Then, there are still possible hands where the player hand, but not the banker hand, will draw a card, where the banker hand, but not the player hand, will draw a card, and where no hand will receive a third card. It will be apparent that the number of video clips that would need to be recorded and stored to show all possible baccarat hands in order to simulate a live casino studio environment to a player is prohibitive due to at least data storage and filming requirements.

Figure 9:
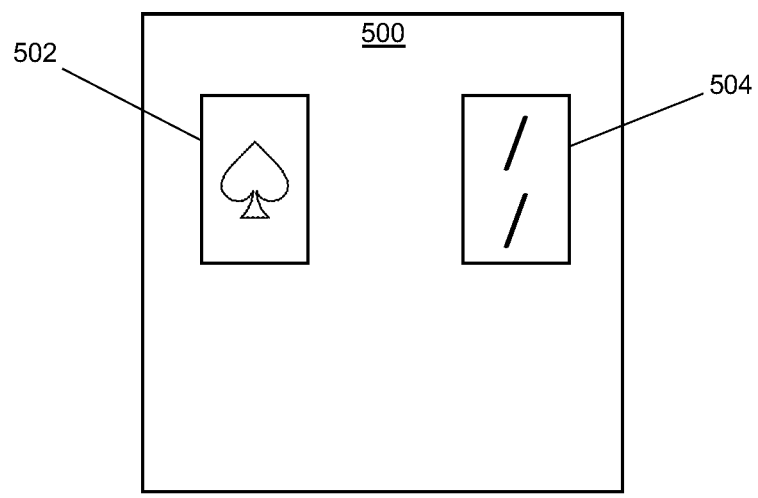
FIG. 9 is an overhead view of two cards dealt on a playing surface associated with the card game, in accordance with an example.

FIG. 9 illustrates an example extract of a rendered video clip where two cards are dealt onto a playing surface of a table 500. The face of the first card 502, an ace of spades, has already been revealed to a user and is shown on the playing surface. The face of the second card 504 is yet to be revealed. The video clip depicts the face of the first card 502 while the second card 504 is turned over to reveal the face of the second card 504.

As noted above with respect to FIGS. 3-8, a single video clip could be recorded for each and every combination of cards that could be dealt. In this case, 2704 (i.e., 52×52) different video clips would be required to show every combination of two cards being drawn from two stacks of cards that each include 52 different cards. For example, if the first card drawn is an ace of spades, 52 videos would need to be captured for the reveal of the second card, each of the 52 video clips showing one of the possible 52 values for the second card. Similarly, 52 videos would be needed if the first card is a two of spades, 52 videos if the first card is a three of spades, etc. Note that if only a single deck of 52 cards were used, there would be 51 possible cards that could be revealed as a second card.

While 2,704 videos could still be manageable, one can appreciate that the total number of required video clips rapidly increases as more cards are dealt. For example, following the example above, if a third card from a third stack of cards is to be revealed during gameplay 140,608 (i.e., 2704×52) video clips will be required. Likewise, 7,311, 616 video clips will be required when four cards are to be revealed, 380,204,032 video clips will be required when five cards are to be revealed, etc.

As noted above, example systems and methods disclosed herein result in a significant reduction in the number of video clips that need to be stored and recorded to facilitate simulation of a live entertainment activity by overlaying image files onto a reduced number of video sequences. In an example, a video clip template depicting first blank card being dealt to a first region on a playing surface are recorded. First, rendered video clips associated with each card in the stack are generated by overlaying static images that depict the faces of cards on the first blank card depicted in the video clip template. This results in a first rendered video clip for each card of the card stack depicting the card being dealt to the first region of the playing surface. For example, when the stack includes 52 different cards, 52 first rendered video clips are generated. These aspects reduce the number of person-hours and equipment otherwise required to generate video clips with all combinations of cards.

After generation of the first rendered video clips, an image associated with the last frame or frames of each of the first rendered video clips can be captured and saved to a database. That is, an image depicting the card after it is placed in the first region is stored to the database.

Following the example, a second video clip template that depicts the first blank card in the first region of the playing and a second blank card being dealt to a second region of the playing table is recorded. Second, rendered video clips associated with each card in the stack are generated by overlaying static images that depict the faces of cards on the second blank card depicted in the second video clip template. Then the image associated with the last frame or frames of the first rendered video clip is overlaid onto the first blank card depicted in the second rendered video clip. Therefore, what would have otherwise required 2704 (i.e., 52×52) video clips is reduced to 104 rendered video clips (i.e., 52 first rendered video clips and 52 second rendered video clips). The process above can continue with the third dealt card, fourth dealt card, etc.

Figure 10:
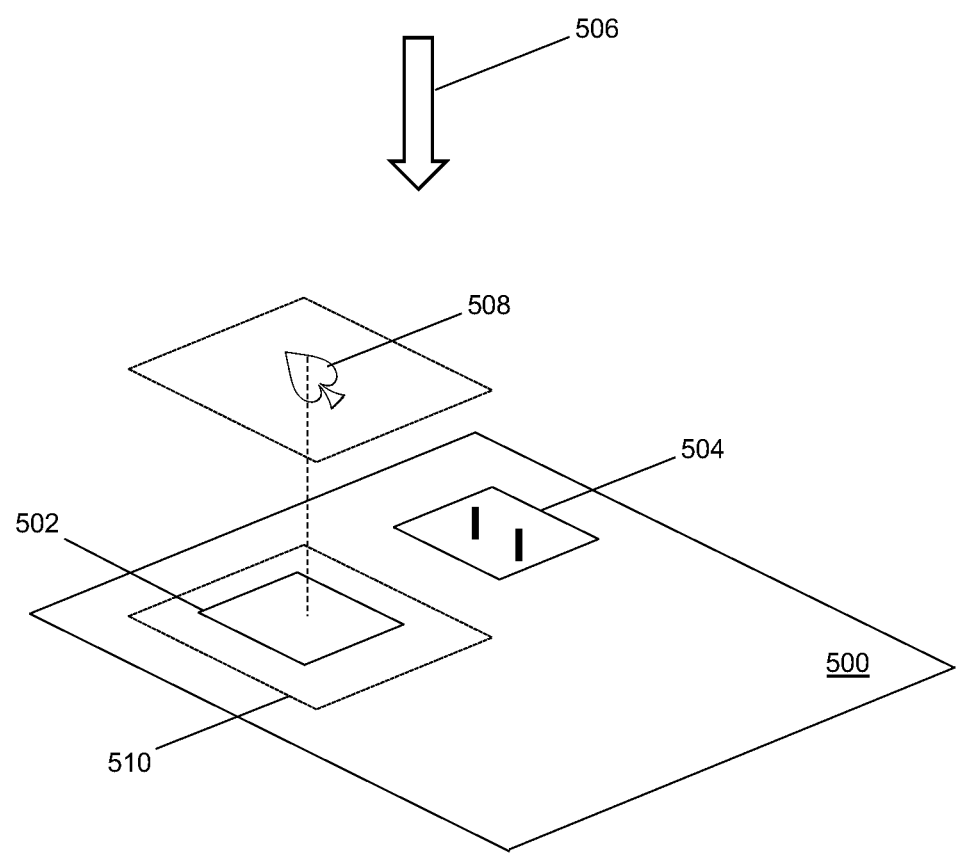
FIG. 10 is a side view showing how the overhead view of FIG. 9 is manipulated, in accordance with an example.

FIG. 10 illustrates these aspects. Following the example in FIG. 9, a first rendered video clip depicts the first card 502 being revealed. In an example, the first rendered video clip is created by digitally manipulating a single video clip template of a blank first card 502 being dealt. Now, a second rendered video clip is needed to show the reveal of the second card 504. A viewpoint 506 of a camera capturing the reveal of the second card 504 is the same as the viewpoint used to capture the reveal of the first card 502, providing an overhead shot similar to the view of FIG. 9. As a result, the position of the face of the first card 502 does not change from the time that it is dealt and revealed in the first video clip.

In an example, static images associated with each of the possible faces of the first card 502 were previously stored in a database. In some examples, the way in which the static images are stored is based on and/or associated with the position of the images at the end of the first rendered video clip showing their reveal. In an example, the second rendered video clip is created by digitally manipulating a video template depicting a single blank second card 504 being revealed. Any previously dealt cards, presently only the first card 502, can remain blank in the second video clip template. Now, an image 508 of the required face for the first card 502 (e.g., the ace of spades) is overlaid onto the blank first card 502 in the second video clip. A border 510 shows a specific location or distinct area in which the image of the face of the first card is placed. In an example, the distinct area is used as a reference point to facilitate accurate placement of the image of the face of the first card 502 during overlaying thereof onto the second video clip template. In an example, this distinct area will surround and will include the blank first card 502. The combination of the second video clip template and the overlaid image 508 in the distinct area may then show the reveal of the second card with the correct first card simulated.

Therefore, 52 second rendered video clips, and 52 image files are used to show the 2704 (i.e., 52×52) different two-card combinations to a user during the reveal of the second card. It should be noted that 52 first rendered video clips showing the first card 502 being revealed will still be required. Thus, 52 first rendered video clips showing the first card being revealed, 52 second rendered video clips showing the second card being revealed, along with 52 image files, are then needed to show the reveal of all 2,704 total possible two-card combinations.

In an example, the first and second rendered video clips created and configured using this method are then displayed to a user in the appropriate order. First, one of the 52 first rendered video clips of the first card being revealed, and second, one of the 52 second rendered video clips of the second card being revealed, along with an appropriate image overlaid onto the first card, can be communicated to a client/user device. In an example, the first rendered video clip and the second rendered video clip can be stitched together at the client device in a final video clip to appear as one seamless transition. The image depicting the last frame or frames of the first rendered video clip is overlaid onto the final video clip at the time of transition between the first rendered video clip and the second video clip. This is required because the second rendered video clip depicts a blank card in the card placement region associated with the first rendered video clip.

The method described with reference to FIG. 10 results in a user seeing a view identical to the view shown in FIG. 9, with the second card 504 then being revealed. The method can be extrapolated to cover any number of additional cards that could be dealt and can be used to show any type of card game, any possible hand, games, and the like.

It will be apparent that the data storage capabilities required to store all required video clips is significantly reduced by employing the proposed method. This necessarily leads to a significant reduction in data storage requirements. In addition, the time required to capture all the required video clips is also reduced, both by digital manipulation of cards and the use of images to represent previously revealed cards. This necessarily leads to a reduction in working hours for at least dealers or models and camera operators in such video clips, as well as a reduction in studio rental time where such video clips are typically captured.

The benefit of the proposed solution significantly increases if more cards are used in a card game. As an example, the number of rendered video clips needed to depict six cards dealt in a row, with six different card decks, which results in 19 billion card combinations, is 312 (i.e., 52×6) along with 260 images (i.e., 52×5 images) for overlaying onto the first five blank cards while the sixth card is dealt.

In some examples, and with some card games, groups of cards on a playing surface are dealt so close to each other that they can be grouped into a single distinct area. These cards can be considered a unit, and in some cases, interact with or touch each other during their reveal. Where there are two cards in such a distinct area or group, 2,704 possible combinations may be required to be individually created from a video clip template of blank cards being revealed, requiring 2,704 rendered video clips to be stored in memory. However, this is still significantly lower than the number of rendered video clips that would otherwise have to be stored.

FIGS. 11 to 17 illustrate examples of views of a playing surface 600 where baccarat is played that are captured by an overhead camera during the game. Like reference numerals relate to like components and elements. The viewpoint of the overhead camera remains static for the duration of the game.

As noted above, in examples, video clip templates and static image files are provided to show each possible card combination to facilitate overlaying of the static images onto the video clip templates.

Figure 11:
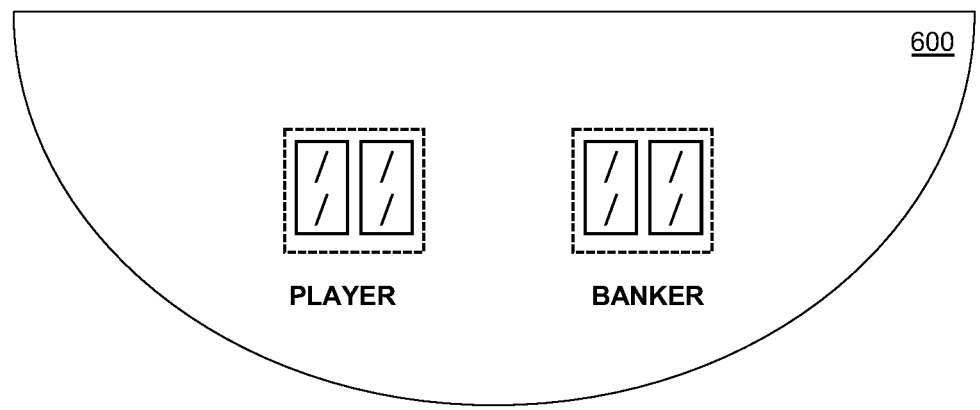
FIGS. 11 to 16 show overhead views provided during a first card game whilst employing the proposed systems and methods, in accordance with an example.

Moving now to FIG. 11, in an example, a first video clip template depicts the first four cards being dealt face down onto a playing surface 600. In some examples, the video clip template depicts the dealer, a card shoe, or the like to provide an immersive experience to a user. Incorporating views of different aspects of the game can improve the user's overall experience. In some examples, the face values of the cards are only visible via an overhead, static camera, as presently shown. This removes the requirement for image manipulation for multiple camera angles. In some examples, the rear of the cards can, however, be visible in any view, for example, where the cards are shown in the card shoe.

In an example, an RCSC 112 is used to determine which cards are to be shown to a user. In an environment where the video is streamed to a user's electronic device, video clips can be remotely stored on a database accessible by a server that facilitates the performance of the operations disclosed above. An example of the RCSC 112 is similarly accessible by and/or operated by the server. An example of the RCSC 112 determines the details of all cards to be revealed during a round in conjunction with the rules of the game or can determine the cards sequentially as and when appropriate during play.

Figure 12:
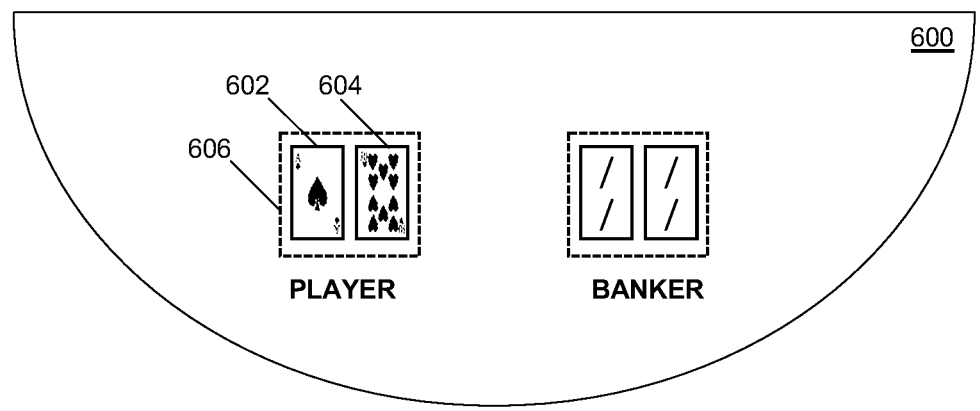

In FIG. 12, the values of the player's hand first card 602 and the player's hand second card 604 have been revealed to a user, showing the card values determined by an RCSC 112. In an example, this aspect forms part of the first rendered video clip. The player's hand first card 602 is an ace of spades, and the player's hand second card 604 is a ten of hearts, providing a value of one to the player hand. As these two cards are close together, they may interact with each other or may be positioned at the same time during their reveal. As a result, in some cases, they can be considered as a unit, and they are shown in a first distinct area 606. In the first video clip template where cards are dealt into the first distinct area 606, the first distinct area 606 could be considered to be the active distinct area. In some examples, when there are 2,704 possible two-card combinations in the first distinct area 606, 2,704, first rendered video clips are stored in the database to facilitate streaming for view by a user as and when selected by the RCSC 112.

The 2,704 video clips can be created from a first video clip template showing two blank cards being dealt, with the first video clip template then being modified, frame by frame, into a first rendered video clip so that the face of each card is shown on the appropriate blank card. In practice, the assets or images, so inserted onto each of the two blank cards, can be done only once for a first possible combination of the two cards. Then, as the dimensions of the other assets representing the remaining 51 face values are expected to be the same, an automated program replaces the initially inserted face assets with the 51 remaining face values to create 2,704 different first rendered video clips representing each possible combination of the player hand. In some cases, individual quality checks are performed on each rendered video clip to ensure the accuracy of the automated process.

In some examples, an image of the final position of each face asset (i.e., the last frame or frames of a rendered video clip) is then stored as an image file, possibly a portable network graphics (PNG) file and can then be overlaid onto further rendered video clips as detailed above with reference to FIG. 10. All 2,704 possible card combinations in the first distinct area 606 will then also be available as PNG files.

The cards in the first distinct area 606 will not move until the end of the game but will remain static. Overlaying the PNG images onto further rendered video clips wherein the player's hand first card 602 and player's hand second card 604 are blank will make it appear as if the faces and values of these cards remain the same.

As noted above, digitally manipulating a single video clip template of two cards being revealed into 2,704 rendered video clips facilitates a reduction in storage requirements. However, the additional use of PNG images provides further advantages, as detailed below.

Figure 13:
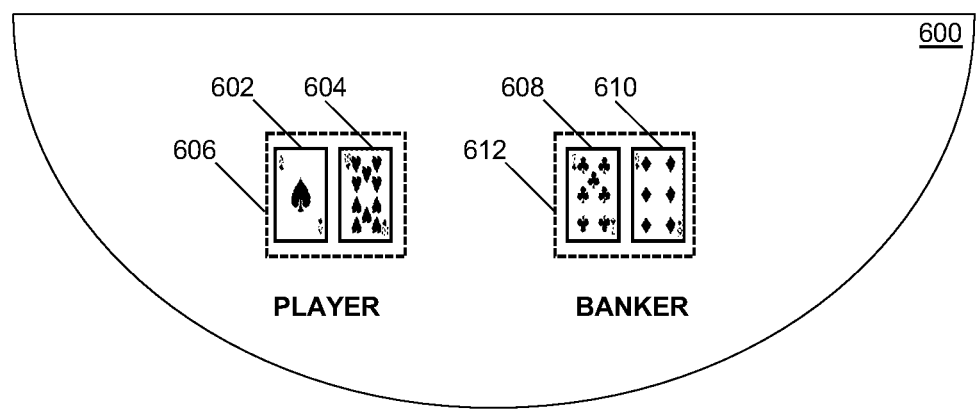

In FIG. 13, the two cards of the banker hand have also been determined by the RCSC 112 and have been revealed to the user in a second video clip template. The banker hand's first card 608 and the banker hand's second card 610 are shown in a second distinct area 612. The first distinct area 606 is an inactive distinct area in the second video clip template, and the second distinct area 612 is an active distinct area. The banker hand's first card 608 and second card 610 are similarly close together and are considered a unit for the same reasons outlined above in respect of the first two cards. The banker hand's first card 608 is a seven of clubs, and the banker hand's second card 610 is a six of diamonds. This provides a value of three to the banker hand.

As described above with reference to FIG. 12 and the reveal of the first two cards, in some examples, 2,704 second rendered video clips are created by manipulating a second video clip template of blank cards associated with the revealing of the cards in the second distinct area.

Instead of storing 2,704 video clips for each of the 2,704 possible combinations for the player hand, each of the 2,704 second rendered video clip depicts the banker hand being revealed only show blank player cards in the first distinct area. The first and second rendered video clips may now be used to provide the appearance of a single video file—the first clip where the player hand is revealed, and a second clip where the banker hand is revealed, but where the player cards are blank. The PNG files for the first distinct area 606, stored in relation to the player hand, may then be overlaid onto the second rendered video clip and onto the blank cards shown therein to provide the appearance of the player hand remaining the same.

This has now reduced the minimum available video files from 7,311,616 (i.e., 2704×2704) to 5,408 (i.e., 2,704 plus 2,704) video clips and 2,704 PNG files. This results in a 1,300-factor reduction in video clips that would otherwise be required to show all possible card combinations for the first four cards being dealt.

If any further cards are required by either the player or the banker hand, operations similar to those described above can be implemented for each further video clip template showing a card that is revealed, with card values overlaid onto blank cards to simulate a previously dealt card. The game may now progress according to the rules outlined above with reference to FIGS. 4 to 7. As the player hand has a value of one, and the banker hand has a value of three, the player hand will now receive another card.

Figure 14:
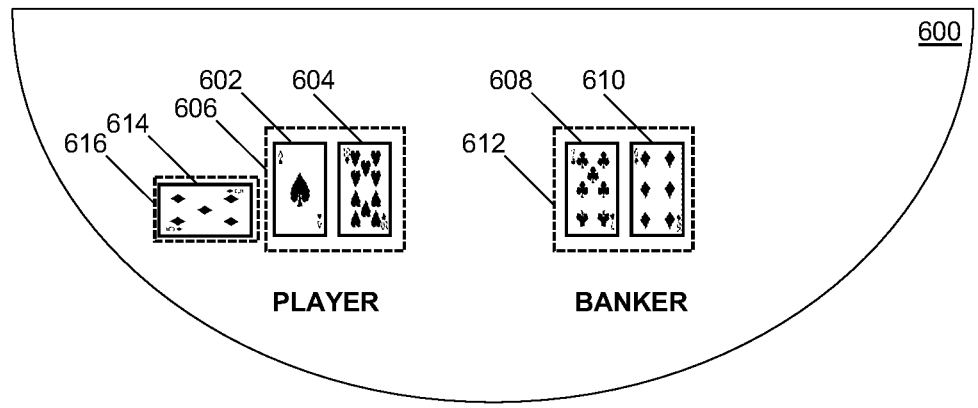

In FIG. 14, a third card has been dealt to the player hand, now the player hand's third card 614 on the table. The player hand's third card 614 is shown in a third distinct area 616 and is a five of diamonds. FIG. 14 relates to a third video clip template. The third distinct area is now the active distinct area, and the first distinct area 606 and the second distinct area 612 are inactive distinct areas.

Similar to the operations described above, all possible third rendered video clips of the player hand's third card 614 being dealt may have been created from a third video clip template of a blank card being dealt in the same manner as previously described. PNG image files are also created from the final position of the card faces for later use. The cards in the first distinct area and second distinct area will typically be blank in all 52 of the third rendered video clips, and the appropriate images selected from the 2,192 possible images for each of the first and second distinct areas may be overlaid onto the third rendered video clip showing the reveal of the third card to the player hand.

Again, the RCSC 112 can then select, either at the beginning of the game or in near real-time, the card to be revealed as the player hand's third card 614 in the third distinct area 616. The appropriate PNG image files are overlaid onto the blank cards in the first distinct area 606 and the second distinct area 612 as the third rendered video clip of the reveal of the third card of the player hand is streamed to the user.

With video clips split up and images overlaid onto blank cards in the first distinct area 606 and second distinct area 612, the number of video clips required is 5,460 (i.e., 5,408+52). The number of PNG files required thus far is 5,408 (i.e., 2,704+2,704). In some examples, PNG images are stored to represent card faces in the third distinct area 616.

Figure 15:
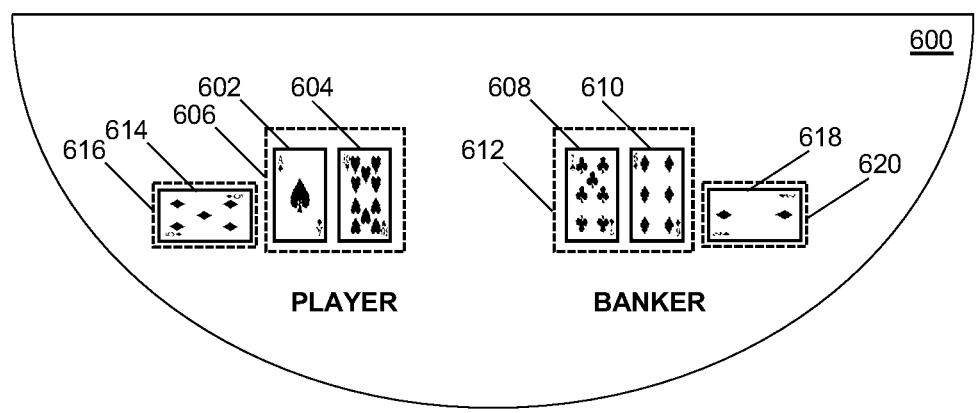

Moving then to FIG. 15, the rules of the game specify that a further card should also be dealt to the banker hand as the value of the banker hand is three, and the third card dealt to the player hand is not an eight. In a fourth rendered video clip, the banker hand has received a third card 618, a two of diamonds. The banker hand's third card 618 is shown in a fourth distinct area 620, which is also the active distinct area, with the other distinct areas being inactive distinct areas. As before, 52 different fourth rendered video clips may have been created from a fourth video clip template that depicts this third card 618 of the banker hand being dealt in the fourth distinct area, while all other cards on the table are blank. When any of the 52 rendered video clips are to be shown to a user, a PNG image is again be overlaid onto cards in the first distinct area 606, the second distinct area 612, and the third distinct area 616. Now, the number of video clips required increases by 52, providing a total of 5,512 (i.e., 5,460+52). The total number of PNG images required at this stage is 5,460 (i.e., 5,408+52).

The value of the player hand is now six, and the value of the banker hand is five. The player hand wins the round, as their hand value is the closest to nine.

The number of PNG images does not necessarily need to increase at this stage, as all possible video clips that lead to the current card layout will terminate at this stage. No PNG images may be needed for overlaying onto the fourth distinct area 620. Instead, the fourth rendered video clip showing the banker hand's third card 618 being dealt and revealed may merely be paused when it has been placed in its final location, or a final image showing the playing surface 600 with all the cards in position may be shown to the user whilst the game ends. Further video clips may still be used, for example, a video clip of the dealer collecting the cards, but such clips need not show the faces of the cards, thus not requiring additional digital manipulation.

Depending on the first four cards dealt, the rules of baccarat may require the player hand to not receive a third card, while the banker hand must receive a third card. Then, instead of moving from a layout shown in FIG. 13 to that of FIG. 14, the game could move from the layout in FIG. 13 to that shown in FIG. 16. Different card and hand values to that shown in FIG. 13 will off course then be applicable.

Figure 16:
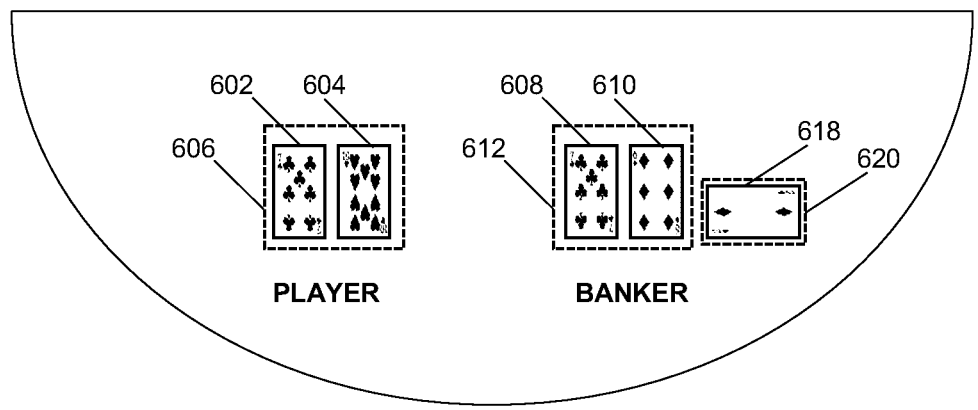

Now, when considering FIG. 16, the player hand's first card 602 is a seven of clubs, and the player hand's second card 604 is a ten of hearts. The banker hand's first card 608 is also a seven of clubs, and the banker hand's second card 610 is a six of diamonds. It should be noted that as more than one deck of cards is used, the same card, with the same value and suit, may be dealt on the table.

The value of the player hand is seven, meaning the player stands pat. The value of the banker hand is three, which means the banker hand draws a third card. The banker hand then receives a third card 618, which correspond to a two of diamonds. The banker hand's third card 618 being dealt into the fourth distinct area 620 can be depicted in a further rendered video clip, where the fourth distinct area is the active distinct area and the other applicable distinct areas are inactive distinct areas.

As before, 52 different video clips are created from a video template showing this third card 618 of the banker hand being dealt in the fourth distinct area, while all other cards on the table are blank. When any of the 52 video clips are to be shown to a user, a PNG image is again overlaid onto blank cards in the first distinct area 606 and the second distinct area 612. Now, the number of rendered video clips required increases by 52 to 5,564. The game will then end when the banker's hand third card has been revealed.

In an example, the 52 rendered video clips required to show all possible third banker cards being dealt with the layout shown in FIG. 16 are filmed using the same PNG images previously stored for the first distinct area 606 and the second distinct area 612. In an example, the cards in these distinct areas are left in their original positions, with the card previously dealt into the third distinct area 616 having been removed, for filming the layout of cards shown in FIG. 16. This ensures continuity in that the cards in the first distinct area 606 and second distinct area 612 do not move, and that the PNG images used for overlaying onto the rendered video clip showing the banker hand's third card 618 being dealt and revealed can be used in the configuration shown in FIG. 16 without the need to adjust the position of the images.

Again, the number of PNG images does not need to increase at this stage, as all possible video clips will terminate at this stage. No PNG images may be needed for overlaying onto the fourth distinct area 620. Instead, a rendered video clip showing the banker hand's third card 618 being dealt and revealed may again be paused when it has been placed in its final location, or a final image showing the playing surface 600 with all the cards in position may be shown to the user whilst the game ends. Further video clips may again still be used, for example, a rendered video clip of the dealer collecting the cards, but such clips need not show the faces of the cards, thus not requiring additional digital manipulation.

As indicated above, in some examples, rendered video clips of cards being dealt and received by the player hand and banker hand are combined and shown to a user as appropriate. In between showing cards being dealt, video clips and camera angles may be used to show, for example, the dealer, a card shoe, and the like. Seamless switching between different views and camera angles can improve a user's overall experience. As indicated above, the value of cards dealt and revealed can be determined by an RCSC 112, and the appropriate rendered video clips and PNG images may be used to provide an experience to a user that mimics or simulates a live dealer environment.

As an example, rendered video clips can be categorized according to their content. Category A clips can show the first two cards of the player hand being revealed and can include the player and banker hands being dealt (but not yet revealed). Category B clips can show the banker hand being revealed, while the player hand's original cards are shown blank. Category A and B clips will always be required. Category C clips can show the player hand receiving a third card while there are blank cards in the position for the first two cards of each hand. Category D clips can show the banker hand receiving a third card while the player hand has three blank cards, and category E clips can show the banker hand receiving a third card while the player hand only has two cards. Different category clips can be strung together, possibly with intervening filler video clips in between, to provide an overall experience to a user. The rules of the game, together with the cards determined by the RCSC 112 to be dealt in the different possible positions, will be used to determine which category video clips are shown to a user. Of course, the appropriate image files may be overlaid onto these video clips in the correct positions as and when required.

Some examples of games require only a category A and B video clip to be shown to a user, some a category A, B, and C clip, some a category A, B, C, and D clip, and some a category A, B, and E clip. All of these can use overlaid image files as appropriate and can use filler video clips such as clips showing a dealer talking, a card being removed from a card shoe, and the like to form a complete video sequence for display to a user. In some examples, these filler video clips can use different camera views or angles and need not show the faces of cards. The faces of the card may only be visible via the overhead camera. This may provide the user with an experience of a live entertainment activity of the game of baccarat.

By overlaying high-quality images of card faces onto blank cards with the required accuracy that frame-by-frame insertion provides, the visual quality experienced by a user may be virtually unaffected from an actual card being dealt, as the user may not be likely to realize that the two-dimensional image placed on the card was inserted digitally.

In an example, a graphical user interface (GUI) can be provided to a user that facilitates user interaction with the game. Examples of the GUI facilitate placing bets, seeing user results or progress, seeing a user account balance, adding to a user account balance, provide additional information or the like. The GUI may be provided on top or around the video clip being shown to the user. In an example, card values, as determined by the RCSC 112, can also be shown in the GUI, possibly with animated images of the cards on the playing area. Information generated by the RCSC 112 can, for example, be used to both generate simulated cards on the display, and provide the user with the same card information in the GUI.

In some examples, the databases of video clips and images can be accessible and usable by a remote server computer, streaming the combined video sequences to an electronic device on which a user views the content. In some examples, the databases are locally hosted, for example, in a central location of a casino or the like where gaming computers are located. In other examples, a user's own electronic device, such as a mobile electronic device, personal computer, or the like hosts the rendered video clips and/or the image files, and may itself combine and display the rendered video clips and image files as and when appropriate. However, the RCSC 112 used to calculate game results can be located remotely rather than the user's device. Then, a server computer can facilitate the performance of calculations by the RCSC 112, and can communicate the results of such calculations to the user's electronic device.

In some examples, time synchronization techniques are employed to ensure that images of card faces are displayed and overlaid on rendered video clips at the correct and appropriate times. Cue points can be added into metadata of video clips, which can then be read by the electronic device managing playback of the video sequence. This can prevent and/or eliminate time drift, also known as clock drift. Higher accuracy rates can be achieved when data is read by the electronic device at the time of playback. The electronic device can then use the metadata to display images onto blank cards at the correct time during video sequence playback.

In an example, a video stream consists of a series of rendered video clips, as detailed above. A video player, whether on a web page or in an application, can download the video segments as needed, and combine them to create a seamless video stream. In some examples, when images are to be overlaid onto the video, meta-data is required to specify the time points at which the images are to be shown. By embedding metadata into the video stream, instead of by transmitting the metadata separately, the application facilitating play of the video does not need to load data from two separate sources. Further, no additional synchronization will be required as the data will not be sourced from separate locations.

Many techniques exist that allow the injection of metadata into video files. One technique involves creating metadata containers, such as ID3 tags, that contain the metadata to be injected at specified points during the video sequence. One ID3 tag may need to be created for each point where metadata is to be injected. A meta macro file can then be used to specify the metadata file to be injected and the time at which the metadata file is to be injected. An example of the meta macro file is a text file specifying which metadata file is to be provided and at which time during the video sequence. The metadata and meta macro files can then be injected into the video sequence. The method used to do this can depend on the type of video configuration software in use and can be provided by standard video streaming software configurations. As an example, the HTTP Live Streaming communications protocol has a standard "mediafilesegmenter" command-line tool that allows this.

In an example, the application or web browser facilitating playback is further configured to action the appropriate response if metadata is encountered during playback. This may be the overlaying of image files as proposed. In an example, the metadata injected into the video stream includes, in addition to timing information, details of where the reference images are to be positioned in the video format.

By providing separate video files relating to each possible card that could be dealt, and combining such rendered video clips with appropriately configured image files overlaid on top of a blank card, the total number of video clips to be filmed and stored is significantly reduced. As detailed above, if a single video clip is to be available for each and every card combination for just the reveal of the first four cards on a playing surface, 7,311,616 video clips would be required. The number of possible six-card combinations that may need to be shown on a playing surface, as explained with reference to FIG. 8, is over 6 billion. However, as noted above, the method and system described herein facilitates generating all possible card combinations, including four-card, both five-card, and six-card combinations, with, for example, 5,564 rendered video clips and 5,460 PNG images.

As will be apparent, the data storage requirements are significantly reduced by employing the proposed technique. Similarly, filming and studio rental requirements are significantly reduced.

It should be noted that while the minimum number of videos required is significantly reduced, in practice, more than one video clip template of blank cards being dealt to a particular region of the playing surface can be captured (e.g., ten video clip templates). Each such video clip template can be digitally manipulated multiple times so that multiple rendered video clips are available that show a particular card being dealt. Alternating between rendered video clips created from different video clip templates can prevent users from recognizing the similarity between rendered video clips. Additional changes can be made to avoid a user's feeling of familiarity, such as different filler clips when switching between camera views, slightly different reveal rates of cards during digital manipulation, and the like. This can all contribute toward an improvement in a user's overall experience and produce a live entertainment activity. Even if the number of rendered video clips increases tenfold, the total number of rendered video clips to be stored and/or captured is still drastically lower than the over six billion clips required to provide a single video clip for each possible game outcome.

It should be noted that the camera capturing the video clip templates files need not be directly overhead, but could be at an angle and could show surrounding elements such as the dealer. This can contribute to a realistic, real-life feeling for a user. In some examples, cards that are the closest to the camera are dealt first on a table, with cards further away being dealt afterward. This can prevent a dealer's hands from obscuring already-dealt cards, which can require additional post-production work to clear up.

If the type of card game is different from baccarat, and there are no distinct areas where cards are located closely together, the number of rendered video clips and image files required to implement the proposed method will be further reduced.

In some examples, some assets are stored on a user device, for example, the PNG image files, and then only the video files are streamed. This reduces network bandwidth between, for example, the multimedia content server 102 and the user device.

Figure 17:
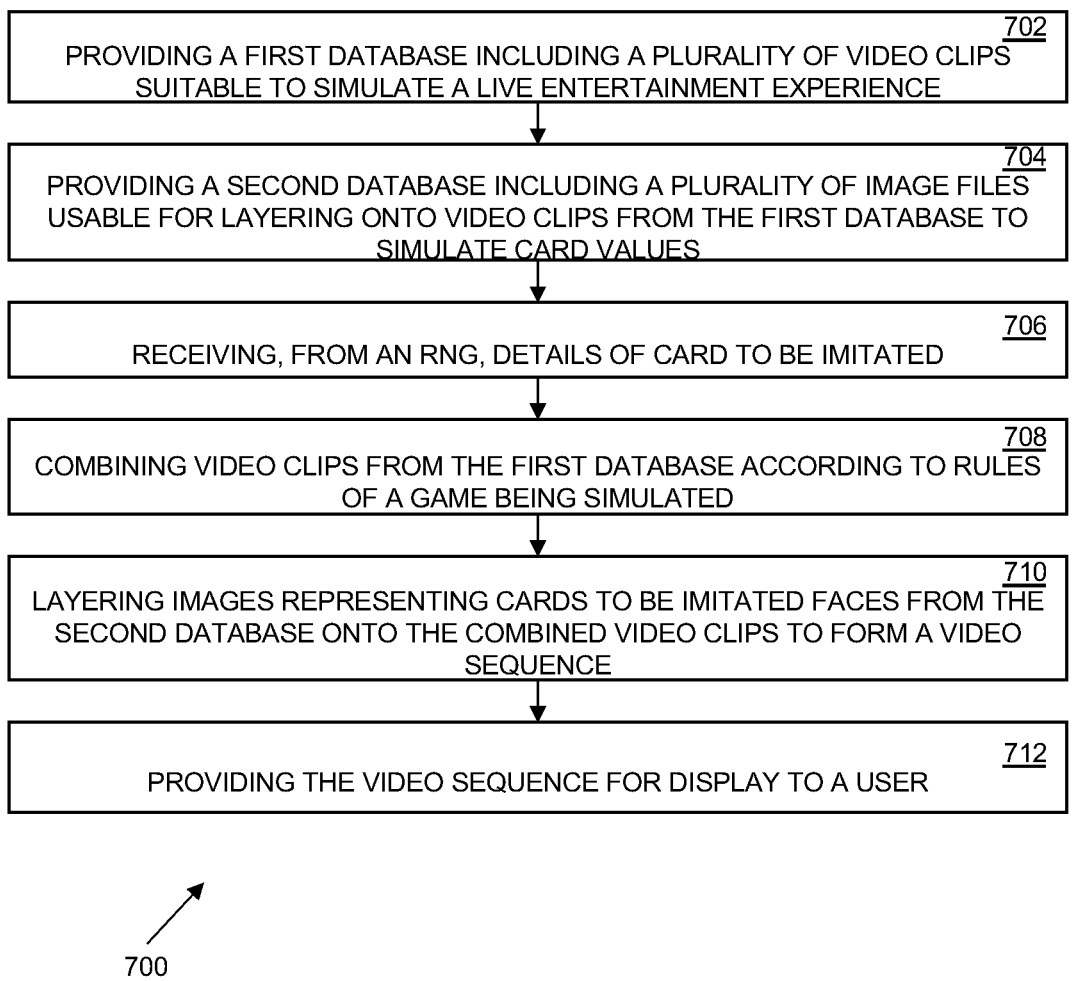
FIG. 17 depicts a flowchart showing operations performed by the multimedia content server, in accordance with an example.

FIG. 17 depicts a flowchart showing operations of a method 700 that can, for example, be carried out using multimedia content server 102. In other examples, the operations of method 700 could be carried out by a different multimedia content server associated with a display. Additionally, certain aspects of method 700 could also be carried out by a remote server. Furthermore, it is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 17. Where used, program code can be stored on any type of computer-readable medium, for example, such as a storage device including a disk or hard drive.

In addition, each block of the flowchart shown in FIG. 17 can represent circuitry that is wired to perform the specific logical functions in the process. Unless specifically indicated, functions in the flowchart shown in FIG. 17 can be executed out of order from that shown or discussed, including substantially concurrent execution of separately described functions, or even in reverse order in some examples, depending on the functionality involved, so long as the overall functionality of the described method is maintained.

Block 702 involves providing a first database including a plurality of video clips suitable to simulate a live entertainment activity, such as a live casino game.

Block 704 involves providing a second database including a plurality of image files usable for overlaying onto video clips from the first database to simulate card faces and card values.

Block 706 involves receiving, from a random number generator, details of cards to be simulated.

Block 708 involves combining video clips from the first database according to rules of the casino game being simulated.

Block 710 involves overlaying images representing the cards to be imitated from the second database onto the combined video clips to form a video sequence.

Block 712 includes providing the video sequence for display to a user.

Figure 18:
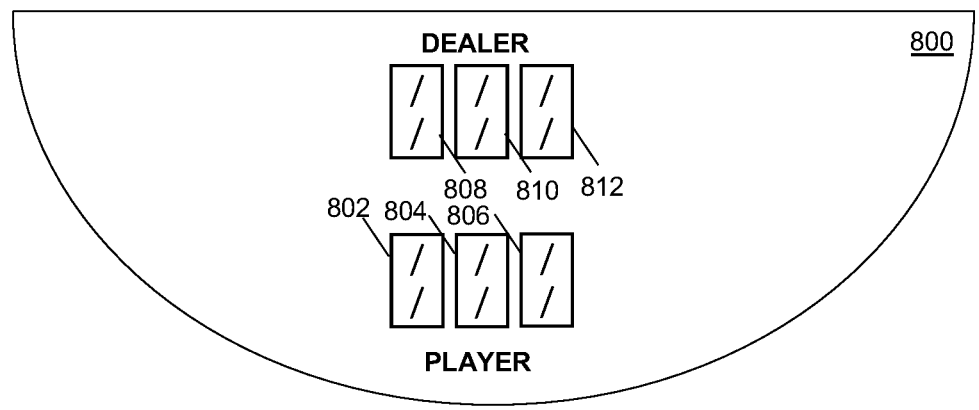
FIG. 18 shows an overhead view provided during a three-card poker card game, in accordance with an example.

A further example embodiment is illustrated in FIG. 18, showing a further example card game being played. A playing table 800 is provided on which three-card poker may be played. Three card poker involves three cards being dealt to a player, and three cards being dealt to a dealer. The player cards 802, 804, 806 are adjacent one another towards one side of the table 800, and the dealer cards 808, 810, 812 are adjacent one another and towards an opposite, second side of the table 800.

Three-card poker can be played with six decks of cards, meaning every one of the six cards on the table can have any one of 52 values. Accordingly, the total number of single video clips required to simulate all possible card combinations is 52×52×52×52×52×52, 19,770,609,664 in total. By using the methods outlined above, the number of video clips may be reduced significantly by using images overlaid onto rendered video clips of blank cards being dealt and shown on the display. Cards may be grouped together to balance the requirement for a reduced number of required video clips and user experience. In order to better simulate a casino environment, cards can be grouped into two groups of three instead of six individual cards.

If each card is revealed on its own, i.e., not as part of a group, the total number of rendered video clips required will be 312 (i.e., 52×6). 260 (i.e., 52×five) image files will also be required. However, it may not be ideal to show every card being revealed by itself. To better simulate gameplay in real life, two groups of three cards can be revealed at the same time. Then, the number of video clips will be 140,608 (i.e., 2×52×52×52), or 281,216 (i.e., 2×140,608). In an example, 140,608 different image files are required. As the player hand will be revealed first, the 140,608 image files are required to be overlaid onto blank player hand cards while a video of the reveal of the dealer hand is shown.

Another option is to group the three cards of the dealer hand together, but to separate the player's hand cards. Then, the number of rendered video clips required is still 140,608 for the dealer hand cards, but 156 (i.e., 52×3) rendered video clips for the player hand, along with 156 image files. During play with this video configuration, the player hand will be revealed first, each of the three cards thereof individually, and then the dealer hand. 156 image files, along with 140,608 plus 156, or 140,764, rendered video clips. While still a relatively high number, it is a significant reduction in the total number of video clips that would otherwise be required to depict each and every possible six-card combination. This may offer a compromise between the lowest number of stored video clips, while still providing a user-friendly playing and viewing experience. The individual card reveal for the user's hand may add to a player's excitement, given that the focus is on a single card, while the combined reveal of the dealer's hand may speed up play and provide a player with continuous oversight over the table.

Figure 19:
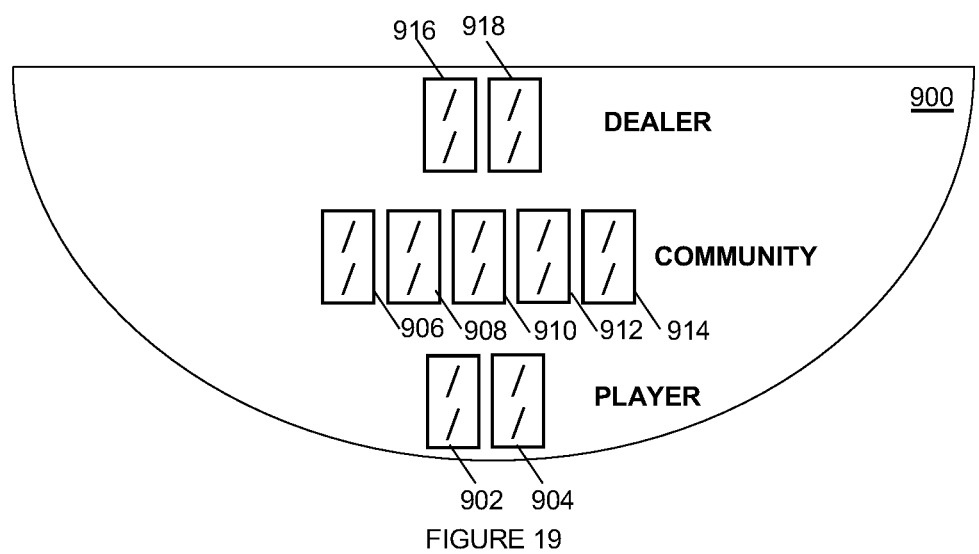
FIG. 19 shows an overhead view provided during a Hold'em poker card game, in accordance with an example.

FIG. 19 shows a yet further embodiment. A table 900 on which as example game, currently Hold'em poker, may be played. In Hold'em poker, two cards 902 and 904 are dealt to a user, then five cards 906, 908, 910, 912, and 914 are dealt as community cards, then two cards 916 and 918 are dealt to the dealer. This provides a total of 9 cards that will always appear on the table. If nine decks of cards are used, the total number of video clips required to show all possibilities of card combinations will be 52^9, or 2,779,905,883, 635,712. Cards are revealed from one side of the table to the next, i.e., player cards first, then community cards, then dealer cards. This provides an advantage in that a dealer's hand need not cross over any cards that have already been dealt from the viewpoint of the user.

There are several options in grouping cards together in order to provide the appropriate video sequence to a player. Three options are specifically described below.

A first option to simulate all nine cards is to simulate each card individually and to overlay card values on top of previously dealt cards. This will require 52 times nine (468) different video clips, along with 52 times 8 image files for overlaying. This may, however, lead to an unnatural gameplay experience, and may take longer to deal if all cards are individually displayed during its reveal.

A second option is to group and reveal the dealer cards together, whilst all other cards are revealed individually. This will then require 52 times 52 (2704) video clips to show all possible dealer hands, and 52 times 7 (364) video clips for the remaining player and community cards. 364 image files will also be required for overlaying on such cards during video playback of the dealer cards.

A third option is to reveal the player cards individually, requiring 104 video clips, the first three community cards together, requiring 52^3 video clips (40,608), the last two community cards together, requiring 52 times 52 (2,704) video clips, and combining the dealer cards as well, requiring another 52 times 52 (2,704) video clips. This will result in a total of 146,120 video clips, with 143,416 image files.

Any of the above three options may be followed, or a combination or modified version thereof. Playing experience should be balanced with the advantages obtained by using the proposed method. That said, it will be apparent that using the proposed method may reduce the required video clips significantly.

Some other poker versions, for example, Casino Hold'em and Ultimate Casino Hold'em, may require the same card layout as that shown in FIG. 19. It is envisaged that the same video clips may be combined to provide the gameplay of other forms of poker to a user. Such other versions may have betting at different points of cards being dealt, but carefully combining video clips and pausing such clips at appropriate times may allow the same video clips to be used.

It will be apparent that any type of card game may be simulated and provided using the methods outlined above. Blackjack is but one other example of a game that may benefit significantly from the proposed methods.

Figure 20:
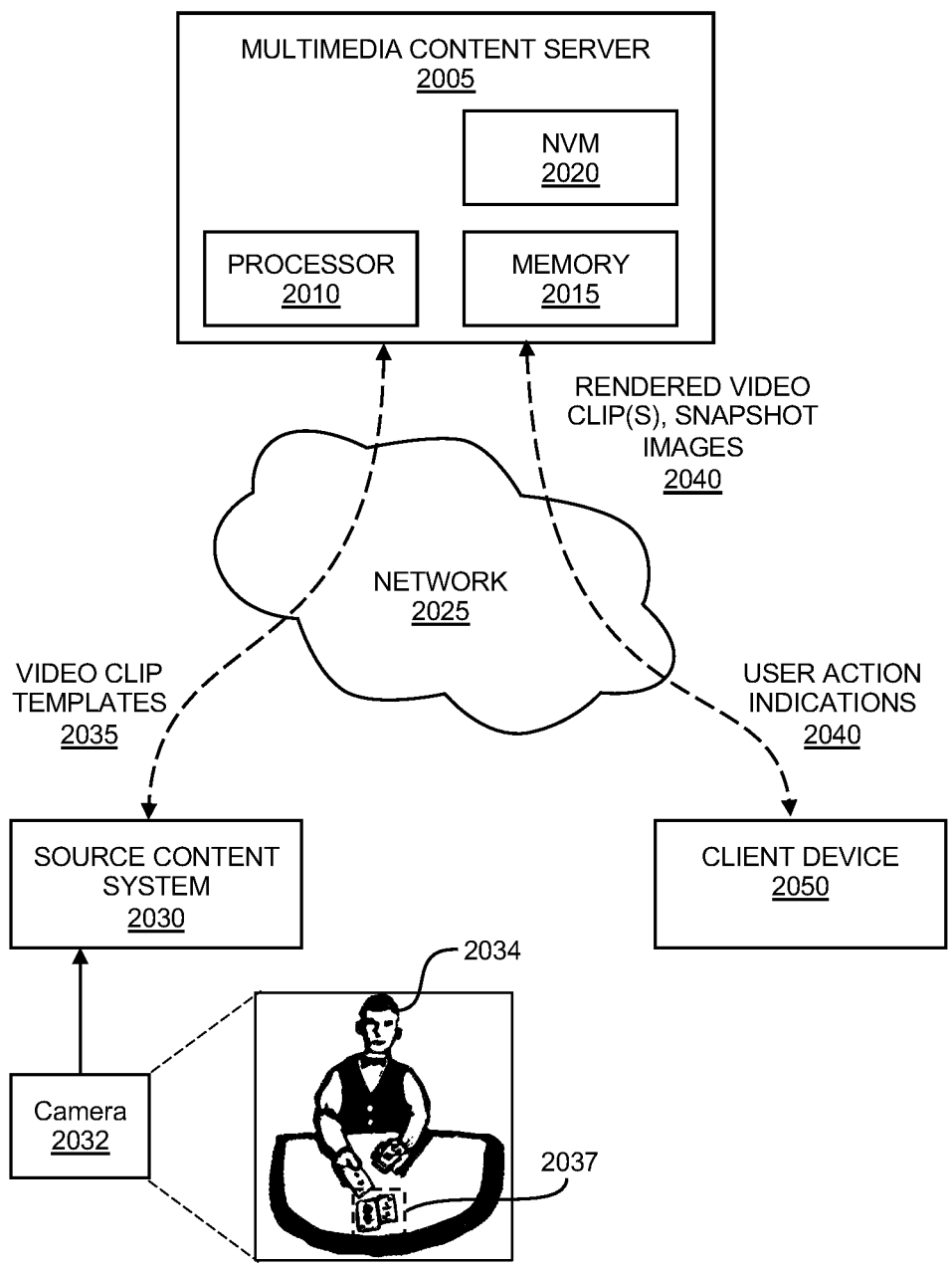
FIG. 20 illustrates a multimedia content serving environment (MCSE), in accordance with an example.

FIG. 20 illustrates an example of a multimedia content serving environment (MCSE) 2000. The MCSE 2000 includes a multimedia content server (MCS) 2005, a source content system, 2030, and a client device 2050. Examples of the MCS 2005, source content system, 2030, and the client device 2050 communicate with one another via a network 2025, such as the Internet.

The MCS 2005 includes a processor 2010, a memory 2015, and non-volatile memory (NVM) 2020. An example of the MCS 2005 corresponds to the multimedia content server 102 described above. For example, the processor 2010 and the memory 2015 of the MCS 2005 can correspond to the processor 104 and the memory component 106 described above. The description of the processor 2010 and the memory 2015 are not repeated for the sake of brevity. An example of the memory 2015 of the MCS 2005 includes instruction code that facilitates performing video editing operations. For example, the MCS 2005 can execute instruction code associated video editing software such as Adobe After Effects®, Adobe Premier Pro®, Apple Final Cut®, etc.

An example of the NVM 2020 corresponds to a mass storage device such as a hard drive or a group of hard drives, flash drive, etc. An example of the NVM 2020 stores a database that includes the video clip templates, rendered video clips, static images, snapshot images, etc., described above. Tables within the database can store the information stored in the first and the second database components (108 and 110), described above. While a single NVM 2020 is illustrated, it is understood that the NVM 2020 can correspond to a group of NVM devices. Further, while illustrated as being within the MCS 2005, it is understood that NVM 2020 or group of NVM devices, as the case may be, can be stored externally, such as in the so-called cloud (e.g., one or more data centers).

An example of the source content system 2030 is a computer system in communication with camera equipment 2032 or configured to processes camera video information. For example, the source content system 2030 can reside in a film studio, as described above. Personnel at the studio can record/generate video clip templates 2035 that depict, for example, a dealer 2034 dealing cards to specific areas 2037 (e.g., active distinct areas) of a playing table. Examples of the cards being dealt are blank cards, as described above. Some examples of the blank card can depict one or more targets that facilitate identifying the blank cards depicted within a video. For example, the targets can be configured to be detected by video editing software, such as Adobe After Effect®.

The video clip templates 2035 can be stored on the source content system 2030 and later communicated to the MCS 2005. For example, the studio can record ten video clip templates 2035, each depicting the dealer dealing one or more blank cards to specific areas of the playing table. The recorded video clip templates 2035 can be communicated to the MCS 2005 as they are recorded and stored or in a batch (e.g., ten at a time).

An example of the client device 2050 corresponds to the client system described above or implements the features and operations performed by the client system, as described above. For example, the client device 2050 can include a display, a keyboard, a touch screen display, a mouse, etc. The client device 2050 can correspond to a desktop computer, mobile device, tablet, etc. An example of the client device 2050 can implement a browser that facilitates receiving content, such as rendered video clip content and snapshot images 2040 from the MCS 2005. An example of the client device 2050 communicates user action indications 2040 to the MCS 2005. For example, a user action indication 2040 can be communicated when the user of the client device 2050 presses a particular region of a touch screen display, such as a widget that facilitates placing a bet or drawing a card.

Figure 21:
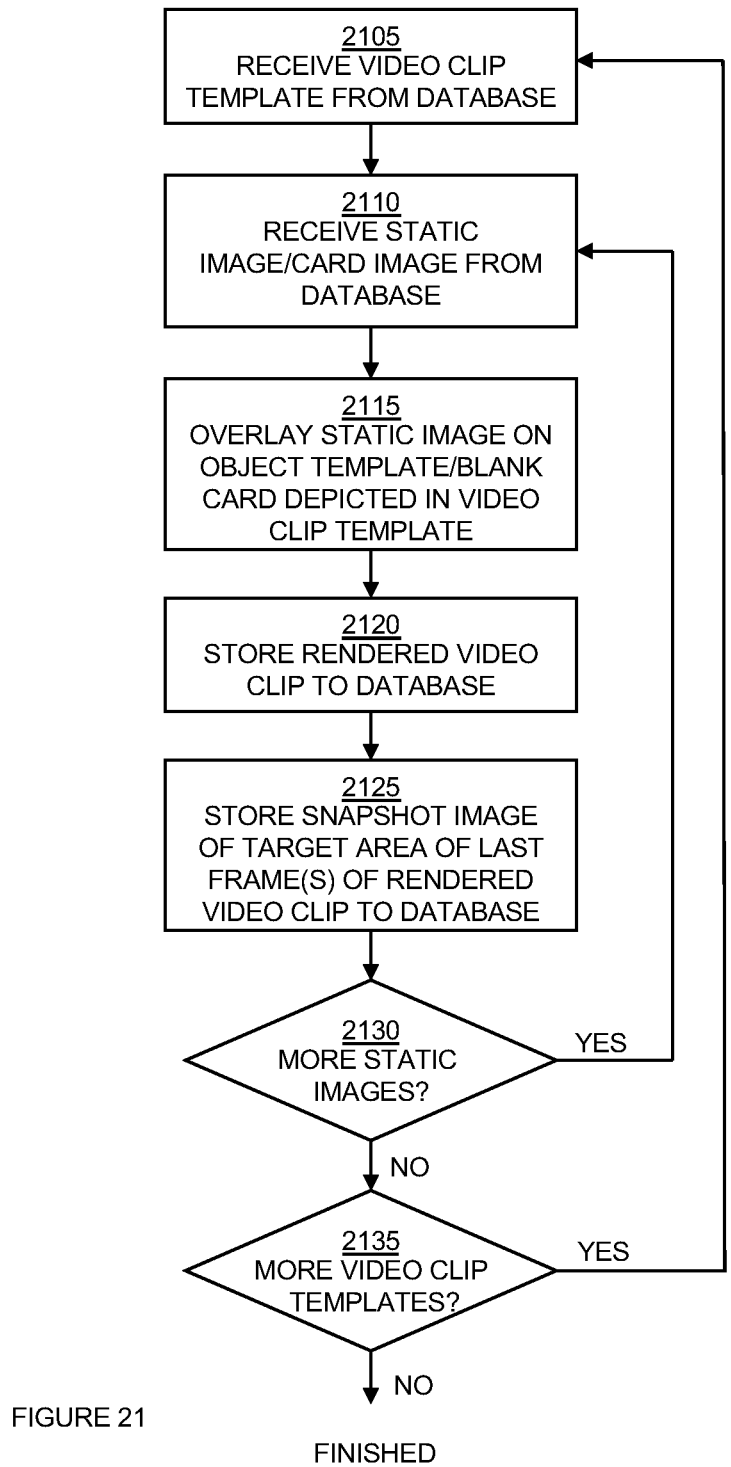
FIG. 21 illustrates operations performed by a multimedia content server of the MCS, in accordance with an example.

FIG. 21 illustrates examples of operations performed by the MCS 2005. These operations may be implemented by one or more of the subsystems of the MCS 2005. In this regard, an example of the memory 2015 stores instruction code that is executed by the processor 2010 of the MCS 2005 to cause the MCS 2005 to perform and/or control other subsystems of the MCS 2005 to perform the operations.

At block 2105, a video clip template is received from a database. As noted above, an example of the database resides within the NVM 2020. In an example, the video clip templates stored in the database are recorded/generated at the source content system 2030 and communicated by the source content system 2030 to the MCS 2005 via a network 2025.

At block 2110, a static image is received from the database. Examples of static images depict the faces of playing cards. For example, in a deck of 52 cards, 52 static images, each associated with a different card of the deck, are stored in the database. In some examples, the static images correspond to pairs of cards. Following the example above, 2704 static images, each associated with a different combination of a pair of cards, can be stored in the database.

At block 2115, the static image is overlaid on to an object template (e.g., blank card(s)) depicted in the video clip template. In an example, overlaying of the static image on the object template is performed by video editing instruction code configured to control the processor 2010 of the MCS 2005 to perform one or more operations that map/overlay the static image to a region of each frame of the video clip template associated with the object template. As noted above, examples of the video editing instruction code correspond to and/or are associated with video editing software such as Adobe After Effects®, Adobe Premier Pro®, Apple Final Cut®, etc. An example of the video editing instruction code is configured to execute a script that controls the video editing instruction code to perform a scripted sequence of video editing operations.

In an example, a first operation involves ingesting the video clip template. This can further involve converting the video clip template into a format better suited to performing video editing operations, such as Apple ProRes.

A next example operation involves performing motion tracking of objects in the video clip template. For example, the motion path of the object template is determined. In another example, the motion associated with the dealer's hand is determined. Motion associated with other objects depicted in the video clip template can be determined.

A next example operation involves generating a mask associated with the object template. As noted above, the object template can correspond to a blank card. The blank card can include tracking features that facilitate determining a mask of the card. In an example, the card can be drawn in a specific color that facilitates readily identifying the card within the video clip template (e.g., the face of the blank card can be drawn in blue or green). Examples of other tracking features include registration marks or the like that facilitate determining the extents and orientation of the card.

In some examples, the mask is adjusted to remove objects that would appear to cover portions of the card, such as the dealer's fingers. In an example, the mask is updated for each frame of the video clip template, and the mask moves across the sequence of frames according to the motion path determined above.

A next example operation involves overlaying the static image onto frames of the video clip template. In this regard, for each frame of the video clip template, the mask controls the video editing instruction code to apply the static image according to rules associated with the mask. Examples of the rules specify how pixels associated with the static image are to be blended with pixels associated with a region of the frame associated with the mask. In some examples, the rules associated with the mask indicate that the pixels of the frame are to be replaced by the pixels of the static image. In addition, the tracking features described above control changes in the orientation of the placement of the static image within each frame (e.g., rotation and translation of the static image).

In some examples, the mask further specifies blurring operations (e.g., a gaussian blur) that blurs the static image. The amount of blurring can be configured to compensate for differences in sharpness between the static image and the underlying content of the video clip template. In some examples, the contrast, brightness, color, etc. associated with the static image can be adjusted to further match the static image to the underlying content of the video clip template.

At block 2120, a rendered video clip is stored in the database. The rendered video clip corresponds to the video clip template as modified according to the overlaying procedures described above.

At block 2125, a snapshot image is taken of a target area of the last frame or frames of the rendered video clip and stored in the database. For example, the final frame or frames of the rendered video clip, that depict the cards on the target region (i.e., the active distinct areas of the playing table where the cards were dealt) is taken. An example of the snapshot image is sized to cover only the target region where the card or cards are placed, such as the active distinct area described above.

If at block 2130, there are additional static images, the operations from block 2110 are repeated. For example, if there are 52 static images representing 52 cards of a deck, the operations are repeated 52 times, and each time, a new static image (i.e., card) is selected and overlaid to the video clip template and subsequently stored to the database.

If at block 2135, there are additional video clip templates, the operations from block 2105 are repeated. For example, if there are ten video clip templates, each depicting a dealer dealing cards to a different region of a playing table, the operations above are performed ten times, and each time, a new video clip template is selected and processed, as described above.

Figure 22:
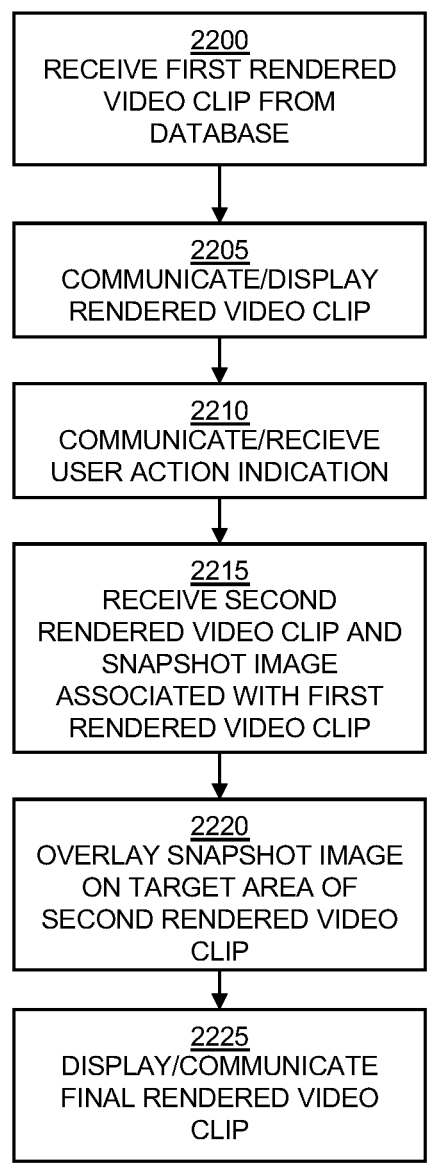
FIG. 22 illustrates operations that facilitate depicting final rendered content on a display, in accordance with an example.

FIG. 22 illustrates examples of operations that facilitate depicting final rendered content on a display. In some examples, the operations can be performed on the MCS 2005. In other examples, the operations are performed on the client device 2050. In yet other examples, some operations are performed on the MCS 2005 while other operations are performed on the client device 2050. Examples of these operations are implemented by one or more subsystems of the MCS 2005 and/or the client device 2050. In this regard, an example of the memory 2015 of the MCS 2005 stores instruction code that is executed by the processor 2010 of the MCS 2005 to cause the MCS 2005 to perform and/or control other subsystems of the MCS 2005 to perform one or more of these operations. Likewise, an example of a memory (not shown) of the client device 2050 stores instruction code that causes the client device 2050 to perform one or more of these operations.

At block 2200, a first rendered video clip is received from the database. For example, the MCS 2005 can receive the first rendered video clip from the database stored in the NVM 2020 of the MCS 2005. In an example, the first rendered video clip is received in response to a user action indication 2040 communicated from the client device 2050. For example, a user of the client device 2050 can launch an application on the client device 2050 that communicates an instruction to the MCS 2005 to receive the first rendered video clip from the database.

At block 2205, the first rendered video clip is communicated to the client device by the MCS 2005 and then displayed on the client device 2050. In some examples, the first rendered video clip is streamed to the client device 2050 to facilitate near real-time playback of the first rendered video clip on the client device 2050.

At block 2210, a user action indication is communicated from the client device 2050 to the MCS 2005. For example, a user action indication 2040 can be communicated when the user of the client device 2050 presses a particular region of a touch screen display, such as a widget that facilitates placing a bet or drawing a card.

At block 2215, in response to the communication of the user action indication 2040, a second rendered video clip and a snapshot image associated with the first rendered video clip are received from the database. For example, the MCS 2005 can receive the second rendered video clip and the snapshot image from the database stored in the NVM 2020 of the MCS 2005.

At block 2220, the snapshot image is overlaid on a target area (e.g., an inactive distinct area of playing table) of the second rendered video clip. The target area corresponds to the active distinct area associated with the first rendered video clip, which in the second rendered video clip corresponds to an inactive distinct area. For example, pixels in the target area of each frame of the second rendered video clip are replaced with pixels from the snapshot image.

At block 2225, the final rendered video is communicated and displayed on the client device 2050. In some examples, the overlaying operation at block 2220 is performed on the client device 2050. For example, the client device 2050 receives the second rendered content and the snapshot image along with metadata that specifies the way in which the snapshot image should be overlaid on the second rendered video clip. The client device 2050 then overlays the snapshot according to the metadata. In other examples, overlaying is performed on the MCS 2005, and the final rendered video is communicated to the client device 2050.

According to the operations above, the first rendered video content and the second rendered video content are communicated in response to separate user action indications 2050. In some examples, both the first rendered video content and the second rendered video content are communicated responsive to the same user action indication 2050. In this case, in an example, the first rendered video content and the second rendered video content are joined/stitched together into one longer rendered video content sequence. At the point at which the second rendered video content begins in the longer sequence, the snapshot image associated with the first rendered video content is overlaid onto frames of the longer rendered video content sequence. This, in turn, gives the appearance of a fluid transition from the first rendered video content and the second rendered video content. In other words, from the perspective of the user of the client device 2050, the actions (i.e., dealing of cards to a first target/distinct area of the playing table) depicted in the first rendered video content and the actions (i.e., dealing of cards to a second target/distinct area of the playing table) appear as one fluid action performed by, for example, the dealer.

Figure 23:
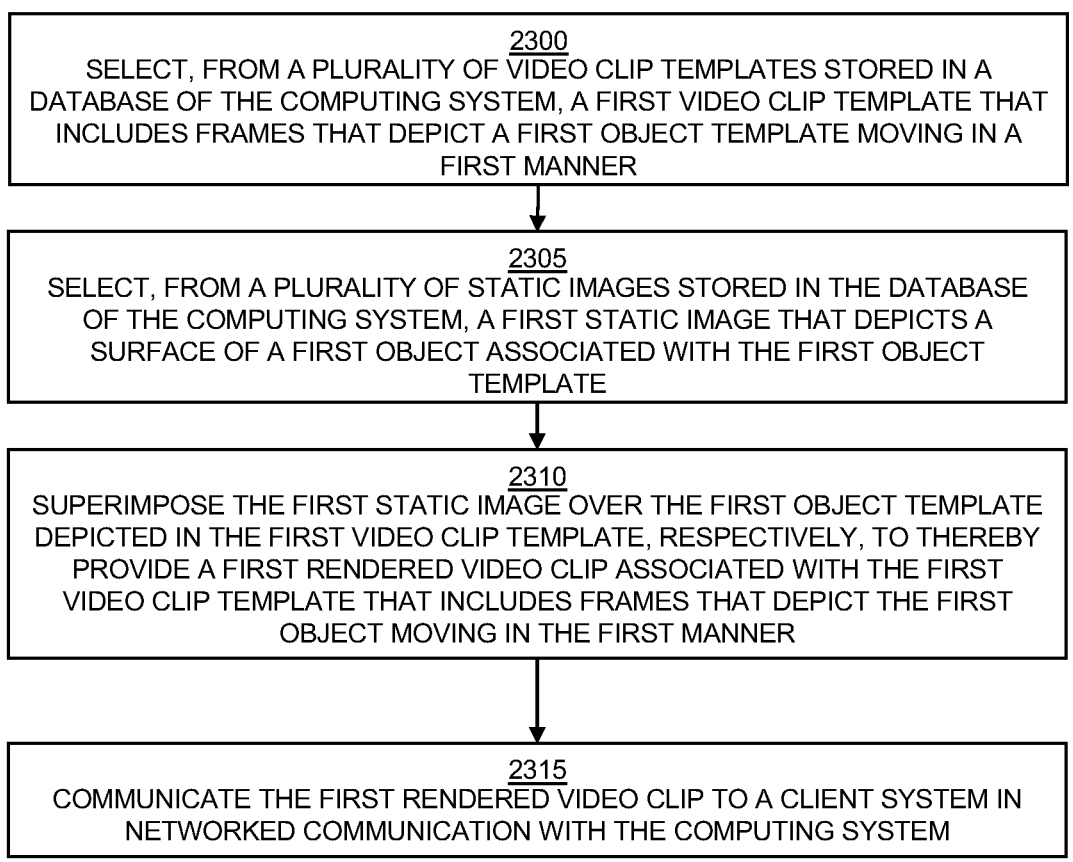
FIG. 23 illustrates a method implemented by a computing system such as the multimedia content server to reduce memory requirements associated with storage of video content, in accordance with an example.

FIG. 23 illustrates an example of a method implemented by a computing system such as the multimedia content server to reduce memory requirements associated with storage of video content, such as video content associated with an entertainment activity.

Block 2300 involves selecting, from a plurality of video clip templates stored in a database of the computing system, a first video clip template that includes frames that depict a first object template moving in a first manner. For example, the video clips templates can correspond to any of the video clip templates described above. In some examples, the video clip templates depict, for example, a dealer dealing cards to different regions of a playing surface. The object templates can correspond to blank cards depicted in the video clip templates.

Block 2305 involves selecting, from a plurality of static images stored in the database of the computing system, a first static image that depicts a surface of a first object associated with the first object template. For example, the static images can correspond to images of the faces of playing cards. The images can depict the number and suit of the playing cards. The number of images stored in the database can correspond to the number of cards in a standard card deck, such as 52.

Block 2310 involves overlaying the first static image over the first object template depicted in the first video clip template, respectively, to thereby provide a first rendered video clip associated with the first video clip template that includes frames that depict the first object moving in the particular manner. For example, the static image can be overlaid onto the portion of the video clip template that corresponds to a blank card.

Block 2315 involves communicating the first rendered video content to a client system in networked communication with the computing system. The client device can subsequently display the first rendered video content to a user.

Some examples involve successively overlaying each of the plurality of different static images over the first object template depicted in the first video clip template to provide a plurality of first rendered video clips associated with the first video clip template, and storing the first rendered video clips to the database. For example, where there are 52 cards in the deck of cards and a single blank card is depicted in the video clip template, 52 rendered video clips can be generated and stored in the database. Where there are 52 cards in the deck of cards and two blank cards are depicted in the video clip template, 2704 (i.e., 52×52) rendered video clips can be generated and stored in the database. In these examples, communicating the first rendered video content to the client system can involve selecting one of the first rendered video clips from the database and communicating the selected first rendered video clip to the client system.

In some examples, each of the first rendered video clips depicts an object being placed in a target region. These examples involve capturing an image of a frame of the first rendered video clip depicting the object after the object is placed in the target region and storing the captured image to the database.

Some examples involve receiving, from the client system, a user action indication. In these examples, selecting one of the first rendered video clips from the database involves randomly selecting one of the first rendered video clips from the database responsive to the user action indication.

In some examples, selecting one of the first rendered video clips from the database involves randomly selecting one of the first rendered video clips from the database according to rules associated with baccarat.

Some examples involve selecting, from the plurality of video clip templates, a second video clip template that includes frames that depict a second object template moving in a second manner that is different from the first manner, selecting, from the plurality of different static images stored in the database of the computing system, a second static image that depicts a surface of a second object associated with the second object template, overlaying the second image over the second object template depicted in the second video clip template, respectively, to thereby provide a second rendered video clip associated with the second video clip template that includes frames that depict the second object moving in the second manner, appending the second rendered video content to the first rendered video content; and communicating the second rendered video content with the appended first rendered video content to the client system.

In some examples, the first rendered video clips depict an object being placed in a target region. These examples involve capturing an image of a frame of the first rendered video clip depicting the object after the object is placed in the target region. In these examples appending the second rendered video content to the first rendered video content involves overlaying the captured image to a region of the second rendered video content associated with the target region.

In some examples, the first object template defines a clipping region. In these examples, overlaying of the first static image over the first object template involves clipping portions of the first static image.

In some examples, each object template defines an outline of a card associated with a deck of cards, and each static image depicts a face of a card of the deck of cards.

IV. Conclusion

This application describes various features and functions of certain example systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures, and as discussed herein, each step, block, and/or communication can represent a processing of information and/or transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents processing of information can correspond to a module, a segment, or a portion of program code (including related data). The program code can include one or more instructions executable by a processor for implementing specific logical functions or actions in the method or technique. The program code and/or related data can be stored on any type of computer-readable media such as a storage device including a disk or hard drive or other storage media.

The computer-readable medium can include non-transitory computer-readable media such as computer-readable media that stores data for short periods of time like register memory, processor cache, and/or random-access memory (RAM). The computer-readable media can include non-transitory computer-readable media that stores program code and/or data for longer periods of time, such as secondary or persistent long term storage, like read-only memory (ROM), optical or magnetic disks, and/or compact-disc read-only memory (CD-ROM), for example. The computer-readable media can be any other volatile or non-volatile storage systems. A computer-readable medium can be considered a computer-readable storage medium, for example, or a tangible storage device.

Software for use in carrying out the described techniques can also be in transitory form, for example, in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations, and permutations of these embodiments will be apparent to those of ordinary skill in the art. Other changes, substitutions, and alterations are also possible without departing from the disclosed machines and methods in their broader aspects as set forth in the following claims.

Further example embodiments are described below with reference to the following clauses.

Clause 1. A multimedia compositing method implemented by a computing system for reducing memory requirements associated with storage of video content, the method comprising: selecting, from a plurality of video clip templates stored in a database of the computing system, a first video clip template that includes frames that depict a first object template moving in a first manner; selecting, from a plurality of static images stored in the database of the computing system, a first static image that depicts a surface of a first object associated with the first object template; overlaying the first static image over the first object template depicted in the first video clip template, respectively, to thereby provide a first rendered video clip associated with the first video clip template that includes frames that depict the first object moving in the first manner; and communicating the first rendered video clip to a client system in networked communication with the computing system.

Clause 2. The method according to clause 1, further comprising: successively overlaying each of the plurality of static images over the first object template depicted in the first video clip template to provide a plurality of first rendered video clips associated with the first video clip template; storing the first rendered video clips to the database; and wherein communicating the first rendered video clip to the client system comprises: selecting one of the first rendered video clips from the database, and communicating the selected first rendered video clip to the client system.

Clause 3. The method according to clause 2, wherein each of the first rendered video clips depicts an object being placed in a target region, wherein the method further comprises: capturing an image of a frame of the first rendered video clip depicting the object after the object is placed in the target region and storing the captured image to the database.

Clause 4. The method according to any preceding clause, further comprising: receiving, from the client system, a user action indication; and wherein selecting one of the first rendered video clips from the database further comprises randomly selecting one of the first rendered video clips from the database responsive to the user action indication.

Clause 5. The method according to any preceding claim, wherein selecting one of the first rendered video clips from the database further comprises, randomly selecting one of the first rendered video clips from the database according to rules associated with baccarat.

Clause 6. The method according to clause 1, further comprising: selecting, from the plurality of video clip templates, a second video clip template that includes frames that depict a second object template moving in a second manner that is different from the first manner; selecting, from the plurality of static images stored in the database of the computing system, a second static image that depicts a surface of a second object associated with the second object template; overlaying the second image over the second object template depicted in the second video clip template, respectively, to thereby provide a second rendered video clip associated with the second video clip template that includes frames that depict the second object moving in the second manner; appending the second rendered video clip to the first rendered video clip; and communicating the second rendered video clip with the appended first rendered video clip to the client system.

Clause 7. The method according to clause 6, wherein the first rendered video clips depicts an object being placed in a target region, wherein the method further comprises: capturing an image of a frame of the first rendered video clip depicting the object after the object is placed in the target region, and wherein appending the second rendered video clip to the first rendered video clip further comprises overlaying the captured image to a region of the second rendered video clip associated with the target region.

Clause 8. The method according to any preceding clause, wherein the first object template defines a clipping region, wherein overlaying of the first static image over the first object template further comprises clipping portions of the first static image.

Clause 9. The method according to any preceding clause, wherein each object template defines an outline of a card associated with a deck of cards, and wherein each static image depicts a face of a card of the deck of cards.

Clause 10. The method according to any preceding clause, wherein the first video clip template depicts a dealer dealing cards to specific regions of a card-playing table.

Clause 11. A multimedia content server configured to perform the method of any of clauses 1-10.

Clause 12. Non-transitory computer-readable media having stored thereon instruction code executable by a processor of a multimedia content server to cause the multimedia content server to perform the methods of any of clauses 1-10.

Clause 13. A multimedia content server for reducing memory requirements associated with storage of video content through multimedia compositing, the multimedia content server comprising: a memory device; and a processor in communication with the memory device, wherein the memory devices stores instruction code that when executed by the processor causes the multimedia content server to perform operations comprising: selecting, from a plurality of video clip templates stored in a database of multimedia content server, a first video clip template that includes frames that depict a first object template moving in a first manner; selecting, from a plurality of static images stored in the database of the multimedia content server, a first static image that depicts a surface of a first object associated with the first object template; overlaying the first static image over the first object template depicted in the first video clip template, respectively, to thereby provide a first rendered video clip associated with the first video clip template that includes frames that depict the first object moving in the first manner; and communicating the first rendered video clip to a client system in networked communication with the multimedia content server.

Clause 14. A multimedia content server according to clause 13, wherein the instruction code is executable cause the multimedia content server to perform operations comprising: successively overlaying each of the plurality of static images over the first object template depicted in the first video clip template to provide a plurality of first rendered video clips associated with the first video clip template; storing the first rendered video clips to the database; and wherein in communicating the first rendered video clip to the client system, the instruction code is executable to cause the multimedia content server to perform further operations comprising: selecting one of the first rendered video clips from the database; and communicating the selected first rendered video clip to the client system.

Clause 15. A multimedia content server according to clause 14, wherein each of the first rendered video clips depicts an object being placed in a target region, wherein the instruction code is executable cause the multimedia content server to perform operations comprising: capturing an image of a frame of the first rendered video clip depicting the object after the object is placed in the target region, and storing the captured image to the database.

Clause 16. A multimedia content server according to clause 14 or 15, wherein the instruction code is executable cause the multimedia content server to perform operations comprising: receiving, from the client system, a user action indication; and wherein in selecting one of the first rendered video clips from the database, the instruction code is executable to cause the multimedia content server to perform operations comprising randomly selecting one of the first rendered video clips from the database responsive to the user action indication.

Clause 17. A computer-readable medium comprising computer-implementable instructions configured to cause a processor of a multimedia content server to cause the multimedia content server to perform the following operations: selecting, from a plurality of video clip templates stored in a database of multimedia content server, a first video clip template that includes frames that depict a first object template moving in a first manner; selecting, from a plurality of static images stored in the database of the multimedia content server, a first static image that depicts a surface of a first object associated with the first object template; overlaying the first static image over the first object template depicted in the first video clip template, respectively, to thereby provide a first rendered video clip associated with the first video clip template that includes frames that depict the first object moving in the first manner; and communicating the first rendered video clip to a client system in networked communication with the multimedia content server.

Clause 18. The non-transitory computer-readable media according to clause 17, wherein the instruction code is executable to cause the multimedia content server to perform operations comprising: successively overlaying each of the plurality of static images over the first object template depicted in the first video clip template to provide a plurality of first rendered video clips associated with the first video clip template; storing the first rendered video clips to the database; and wherein in communicating the first rendered video clip to the client system, the instruction code is executable to cause the multimedia content server to perform further operations comprising: selecting one of the first rendered video clips from the database; and communicating the selected first rendered video clip to the client system.

Clause 19. A client device in networked communication with a multimedia content server, the client device comprising: a memory device; and a processor in communication with the memory device, wherein the memory devices stores instruction code that when executed by the processor causes the client device to perform operations comprising: receiving a first rendered video clip from the multimedia content server, the first rendered video clip having been generated by overlaying a first static image over a first object template depicted in frames of first video clip template that depict the first object template moving in a first manner; display the first rendered video clip; receiving a second rendered video clip and a snapshot image associated with the first rendered video clip from the multimedia content server, the second rendered video clip having been generated by overlaying a second static image over a second object template depicted in frames of second video clip template that depict the second object template moving in a second manner, and the snapshot image having been taken from an end frame of the first rendered video clip and in a first target area of the end frame; overlaying the snapshot image associated with the first rendered video clip over a second target area in the second rendered video clip that corresponds to the first target area of the first rendered video clip to thereby provide a final rendered video clip; and displaying the final rendered video clip on a display of the client device.

Overview

The present disclosure relates to methods and multimedia content server for reducing memory requirements associated with storage of video content through multimedia compositing. An example method includes selecting, from a plurality of video clip templates stored in a database of the computing system, a first video clip template that includes frames that depict a first object template moving in a first manner. The method further includes selecting, from a plurality of static images stored in the database of the computing system, a first static image that depicts a surface of a first object associated with the first object template; and overlaying the first static image over the first object template depicted in the first video clip template, respectively, to thereby provide a first rendered video clip associated with the first video clip template that includes frames that depict the first object moving in the particular manner. The method includes communicating the first rendered video content to a client system in networked communication with the computing system.

What is claimed is:

1. A multimedia compositing method implemented by a computing system for reducing memory requirements associated with storage of video content, the method comprising:
   selecting, from a plurality of video clip templates stored in a database of the computing system, a first video clip template that includes frames that depict a first object template moving in a first manner;
   selecting, from a plurality of static images stored in the database of the computing system, a first static image that depicts a surface of a first object associated with the first object template;
   overlaying the first static image over the first object template depicted in the first video clip template, respectively, to thereby provide a first rendered video clip associated with the first video clip template that includes frames that depict the first object moving in the first manner;
   communicating the first rendered video clip to a client system in networked communication with the computing system;
   successively overlaying each of the plurality of static images over the first object template depicted in the first video clip template to provide a plurality of first rendered video clips associated with the first video clip template;
   storing the first rendered video clips to the database, and
   wherein communicating the first rendered video clip to the client system comprises:
      selecting one of the first rendered video clips from the database, wherein selecting one of the first rendered video clips from the database comprises randomly selecting one of the first rendered video clips from the database according to rules associated with a card game; and
   communicating the selected first rendered video clip to the client system.

2. The method according to claim 1, wherein each of the first rendered video clips depicts an object being placed in a target region, wherein the method further comprises:
   capturing an image of a frame of the first rendered video clip depicting the object after the object is placed in the target region; and
   storing the captured image to the database.

3. The method according to claim 1, further comprising:
   receiving, from the client system, a user action indication, wherein selecting one of the first rendered video clips from the database further comprises randomly selecting one of the first rendered video clips from the database responsive to the user action indication.

4. The method according to claim 1, wherein the card game comprises baccarat, poker, or blackjack.

5. The method according to claim 1, further comprising:
   selecting, from the plurality of video clip templates, a second video clip template that includes frames that depict a second object template moving in a second manner that is different from the first manner;
   selecting, from the plurality of static images stored in the database of the computing system, a second static image that depicts a surface of a second object associated with the second object template;
   overlaying the second image over the second object template depicted in the second video clip template, respectively, to thereby provide a second rendered video clip associated with the second video clip template that includes frames that depict the second object moving in the second manner;
   appending the second rendered video clip to the first rendered video clip; and
   communicating the second rendered video clip with the appended first rendered video clip to the client system.

6. The method according to claim 5, wherein the first rendered video clips depicts an object being placed in a target region, wherein the method further comprises:
   capturing an image of a frame of the first rendered video clip depicting the object after the object is placed in the target region,
   wherein appending the second rendered video clip to the first rendered video clip further comprises overlaying the captured image to a region of the second rendered video clip associated with the target region.

7. The method according to claim 1, wherein the first object template defines a clipping region, wherein overlaying of the first static image over the first object template further comprises clipping portions of the first static image.

8. The method according to claim 1, wherein each object template defines an outline of a card associated with a deck of cards, and wherein each static image depicts a face of a card of the deck of cards.

9. A multimedia content server for reducing memory requirements associated with storage of video content through multimedia compositing, the multimedia content server comprising:
   a memory device; and
   a processor in communication with the memory device, wherein the memory device stores instruction code that when executed by the processor causes the multimedia content server to perform operations comprising:
   selecting, from a plurality of video clip templates stored in a database of multimedia content server, a first video clip template that includes frames that depict a first object template moving in a first manner;
   selecting, from a plurality of static images stored in the database of the multimedia content server, a first static image that depicts a surface of a first object associated with the first object template;
   overlaying the first static image over the first object template depicted in the first video clip template, respectively, to thereby provide a first rendered video clip associated with the first video clip template that includes frames that depict the first object moving in the first manner;
   communicating the first rendered video clip to a client system in networked communication with the multimedia content server;
   successively overlaying each of the plurality of static images over the first object template depicted in the first video clip template to provide a plurality of first rendered video clips associated with the first video clip template;

storing the first rendered video clips to the database, wherein in communicating the first rendered video clip to the client system, the instruction code is executable to cause the multimedia content server to perform further operations comprising:

selecting one of the first rendered video clips from the database, wherein selecting one of the first rendered video clips from the database further comprises, randomly selecting one of the first rendered video clips from the database according to rules associated with a card game; and communicating the selected first rendered video clip to the client system.

10. The multimedia content server according to claim 9, wherein each of the first rendered video clips depicts an object being placed in a target region, wherein the instruction code is executable to cause the multimedia content server to perform operations comprising:

capturing an image of a frame of the first rendered video clip depicting the object after the object is placed in the target region; and storing the captured image to the database.

11. The multimedia content server according to claim 9, wherein the instruction code is executable to cause the multimedia content server to perform operations comprising:

receiving, from the client system, a user action indication, wherein in selecting one of the first rendered video clips from the database, the instruction code is executable to cause the multimedia content server to perform operations comprising randomly selecting one of the first rendered video clips from the database responsive to the user action indication.

12. The multimedia content server according to claim 9, wherein the card game comprises baccarat, poker, or blackjack.

13. The multimedia content server according to claim 9, wherein the instruction code is executable to cause the multimedia content server to perform operations comprising:

selecting, from the plurality of video clip templates, a second video clip template that includes frames that depict a second object template moving in a second manner that is different from the first manner;

selecting, from the plurality of static images stored in the database of the multimedia content server, a second static image that depicts a surface of a second object associated with the second object template;

overlaying the second image over the second object template depicted in the second video clip template, respectively, to thereby provide a second rendered video clip associated with the second video clip template that includes frames that depict the second object moving in the second manner;

appending the second rendered video clip to the first rendered video clip; and communicating the second rendered video clip with the appended first rendered video clip to the client system.

14. The multimedia content server according to claim 13, wherein the first rendered video clips depicts an object being placed in a target region, wherein the instruction code is executable to cause the multimedia content server to perform operations further comprising:

capturing an image of a frame of the first rendered video clip depicting the object after the object is placed in the target region, wherein appending the second rendered video clip to the first rendered video clip further comprises overlaying the captured image to a region of the second rendered video clip associated with the target region.

15. The multimedia content server according to claim 9, wherein the first object template defines a clipping region, wherein overlaying of the first static image over the first object template further comprises clipping portions of the first static image.

16. The multimedia content server according to claim 9, wherein each object template defines an outline of a card associated with a deck of cards, and wherein each static image depicts a face of a card of the deck of cards.

17. A non-transitory computer-readable medium having stored thereon computer-implementable instructions configured to cause a processor of a multimedia content server to cause the multimedia content server to perform the following operations:

selecting, from a plurality of video clip templates stored in a database of multimedia content server, a first video clip template that includes frames that depict a first object template moving in a first manner;

selecting, from a plurality of static images stored in the database of the multimedia content server, a first static image that depicts a surface of a first object associated with the first object template;

overlaying the first static image over the first object template depicted in the first video clip template, respectively, to thereby provide a first rendered video clip associated with the first video clip template that includes frames that depict the first object moving in the first manner; and communicating the first rendered video clip to a client system in networked communication with the multimedia content server;

successively overlaying each of the plurality of static images over the first object template depicted in the first video clip template to provide a plurality of first rendered video clips associated with the first video clip template;

storing the first rendered video clips to the database; and wherein in communicating the first rendered video clip to the client system, the instruction code is executable to cause the multimedia content server to perform further operations comprising:

selecting one of the first rendered video clips from the database, wherein selecting one of the first rendered video clips from the database comprises randomly selecting one of the first rendered video clips from the database according to rules associated with a card game; and communicating the selected first rendered video clip to the client system.

18. The non-transitory computer-readable medium according to claim 17, wherein the card game comprises baccarat, poker, or blackjack.

* * * * *